US007864395B2

(12) United States Patent
Chui

(10) Patent No.: US 7,864,395 B2
(45) Date of Patent: Jan. 4, 2011

(54) LIGHT GUIDE INCLUDING OPTICAL SCATTERING ELEMENTS AND A METHOD OF MANUFACTURE

(75) Inventor: Clarence Chui, San Jose, CA (US)

(73) Assignee: QUALCOMM MEMS Technologies, Inc., San Diego, CA (US)

( * ) Notice: Subject to any disclaimer, the term of this patent is extended or adjusted under 35 U.S.C. 154(b) by 60 days.

(21) Appl. No.: 11/588,947

(22) Filed: Oct. 27, 2006

(65) Prior Publication Data

US 2008/0100900 A1 May 1, 2008

(51) Int. Cl.
*G02F 1/03* (2006.01)

(52) U.S. Cl. ...................................................... 359/245

(58) Field of Classification Search ................. 359/247, 359/242, 245, 238, 277, 320, 290, 291
See application file for complete search history.

(56) References Cited

U.S. PATENT DOCUMENTS

| | | | |
|---|---|---|---|
| 2,518,647 | A | 8/1950 | Teeple et al. |
| 3,813,265 | A | 5/1974 | Marks |
| 3,924,929 | A | 12/1975 | Holmen |
| 4,154,219 | A | 5/1979 | Gupta et al. |
| 4,375,312 | A | 3/1983 | Tangonan |
| 4,378,567 | A | 3/1983 | Mir |
| 4,832,459 | A | 5/1989 | Harper |
| 4,850,682 | A | 7/1989 | Gerritsen |
| 4,863,224 | A | 9/1989 | Afian |
| 4,918,577 | A | 4/1990 | Furudate |
| 4,961,617 | A | 10/1990 | Shahidi |
| 4,974,942 | A | 12/1990 | Gross |
| 5,050,946 | A | 9/1991 | Hathaway |
| 5,123,247 | A | 6/1992 | Nelson |
| 5,226,099 | A | 7/1993 | Mignardi et al. |
| 5,289,300 | A | 2/1994 | Yamazaki |
| 5,291,314 | A | 3/1994 | Agranat |
| 5,339,179 | A | 8/1994 | Rudisill |
| 5,452,385 | A | 9/1995 | Izumi |

(Continued)

FOREIGN PATENT DOCUMENTS

| | | |
|---|---|---|
| CN | 1272922 | 11/2000 |

(Continued)

OTHER PUBLICATIONS

Giles et al., "Silicon MEMS Optical Switch Attenuator and Its Use in Lightwave Subsystems", IEEE Journal of Selected Topics in Quanum Electronics, vol. 5. No. 1, Jan./Feb. 1999,pp. 18-25.

(Continued)

*Primary Examiner*—Timothy J Thompson
*Assistant Examiner*—Tuyen Q Tra
(74) *Attorney, Agent, or Firm*—Knobbe Martens Olson & Bear LLP

(57) ABSTRACT

A method and system for fabricating a light guide is disclosed. The method and system comprise providing a light guide element which includes a plurality of scattering elements located therein and adjusting at least a portion of the scattering elements to maintain their optical scattering character. The present invention provides a system and method for fabricating a front light technology that is inexpensive and can compete on a cost basis with LCD backlight technologies while maintaining reasonable performance.

22 Claims, 17 Drawing Sheets

100''''

192

190

Interferometric modulator substrate

U.S. PATENT DOCUMENTS

| | | | | |
|---|---|---|---|---|
| 5,467,417 | A | 11/1995 | Nakamura | |
| 5,481,385 | A | 1/1996 | Zimmerman et al. | |
| 5,515,184 | A | 5/1996 | Caulfield | |
| 5,555,160 | A | 9/1996 | Tawara | |
| 5,592,332 | A | 1/1997 | Nishio | |
| 5,594,830 | A | 1/1997 | Winston | |
| 5,638,084 | A | 6/1997 | Kalt | |
| 5,647,036 | A | 7/1997 | Deacon et al. | |
| 5,650,865 | A | 7/1997 | Smith | |
| 5,659,410 | A | 8/1997 | Koike | |
| 5,671,314 | A | 9/1997 | Gregory et al. | |
| 5,671,994 | A | 9/1997 | Tai | |
| 5,673,128 | A | 9/1997 | Ohta et al. | |
| 5,703,667 | A | 12/1997 | Ochiai | |
| 5,712,694 | A | 1/1998 | Taira et al. | |
| 5,735,590 | A | 4/1998 | Kashima | |
| 5,771,321 | A | 6/1998 | Stern | |
| 5,782,993 | A | 7/1998 | Ponewash | |
| 5,783,614 | A | 7/1998 | Chen | |
| 5,805,117 | A | 9/1998 | Mazurek | |
| 5,808,708 | A | 9/1998 | Oyama et al. | |
| 5,810,464 | A | 9/1998 | Ishikawa | |
| 5,854,872 | A | 12/1998 | Tai | |
| 5,883,684 | A | 3/1999 | Milikan et al. | |
| 5,892,598 | A | 4/1999 | Asakawa et al. | |
| 5,913,594 | A | 6/1999 | Iimura | |
| 5,914,804 | A | 6/1999 | Goossen | |
| 5,933,183 | A | 8/1999 | Enomoto | |
| 5,956,106 | A | 9/1999 | Petersen | |
| 5,961,198 | A | 10/1999 | Hira | |
| 5,982,540 | A | 11/1999 | Koike | |
| 5,991,073 | A | 11/1999 | Woodgate et al. | |
| 5,999,239 | A | 12/1999 | Larson | |
| 6,002,829 | A | 12/1999 | Winston | |
| 6,014,192 | A | 1/2000 | Lehureau | |
| 6,040,937 | A | 3/2000 | Miles | |
| 6,048,071 | A | 4/2000 | Sawayama | |
| 6,049,317 | A | 4/2000 | Thompson et al. | |
| 6,055,090 | A | 4/2000 | Miles | |
| 6,068,382 | A | 5/2000 | Fukui | |
| 6,073,034 | A | 6/2000 | Jacobsen | |
| 6,074,069 | A | 6/2000 | Chau-Ching et al. | |
| 6,091,469 | A | 7/2000 | Naito | |
| 6,099,134 | A | 8/2000 | Taniguchi | |
| 6,123,431 | A | 9/2000 | Teragaki | |
| 6,128,077 | A | 10/2000 | Jovin | |
| 6,151,089 | A | 11/2000 | Yang et al. | |
| 6,195,196 | B1 | 2/2001 | Kimura | |
| 6,196,691 | B1 | 3/2001 | Ochiai | |
| 6,199,989 | B1 | 3/2001 | Maeda et al. | |
| 6,211,976 | B1 | 4/2001 | Popovich | |
| 6,232,937 | B1 | 5/2001 | Jacobsen | |
| 6,259,082 | B1 | 7/2001 | Fujimoto et al. | |
| 6,273,577 | B1 | 8/2001 | Goto | |
| 6,282,010 | B1 | 8/2001 | Sulzbach | |
| 6,292,504 | B1 | 9/2001 | Halmos | |
| 6,322,901 | B1 | 11/2001 | Bawendi | |
| 6,323,892 | B1 | 11/2001 | Mihara | |
| 6,356,378 | B1 | 3/2002 | Huibers | |
| 6,371,623 | B1 | 4/2002 | Toyoda | |
| 6,381,022 | B1 | 4/2002 | Zavracky | |
| 6,407,785 | B1 | 6/2002 | Yamazaki | |
| 6,412,969 | B1 | 7/2002 | Torihara | |
| 6,454,452 | B1 | 9/2002 | Sasagawa | |
| 6,456,279 | B1 | 9/2002 | Kubo | |
| 6,478,432 | B1 | 11/2002 | Dyner | |
| 6,483,613 | B1 | 11/2002 | Woodgate et al. | |
| 6,504,589 | B1 | 1/2003 | Kashima | |
| 6,512,626 | B1 | 1/2003 | Schmidt | |
| 6,522,794 | B1 | 2/2003 | Bischel et al. | |
| 6,538,813 | B1 | 3/2003 | Magno | |
| 6,574,033 | B1 | 6/2003 | Chui | |
| 6,577,429 | B1 | 6/2003 | Kurtz | |
| 6,582,095 | B1 | 6/2003 | Toyoda | |
| 6,592,234 | B2 | 7/2003 | Epstein | |
| 6,598,987 | B1 | 7/2003 | Parikka | |
| 6,603,520 | B2 | 8/2003 | Umemoto | |
| 6,631,998 | B2 | 10/2003 | Egawa et al. | |
| 6,636,322 | B1 | 10/2003 | Terashita | |
| 6,636,358 | B2 | 10/2003 | Umemoto et al. | |
| 6,642,913 | B1 | 11/2003 | Kimura et al. | |
| 6,643,067 | B2 | 11/2003 | Miyamae | |
| 6,650,455 | B2 | 11/2003 | Miles | |
| 6,652,109 | B2 | 11/2003 | Nakamura | |
| 6,657,683 | B2 | 12/2003 | Richard | |
| 6,660,997 | B2 | 12/2003 | Laberge | |
| 6,669,350 | B2 * | 12/2003 | Yamashita et al. | .......... 362/612 |
| 6,674,562 | B1 | 1/2004 | Miles | |
| 6,693,690 | B2 | 2/2004 | Umemoto | |
| 6,697,403 | B2 | 2/2004 | Lee et al. | |
| 6,700,695 | B2 | 3/2004 | Engler | |
| 6,709,123 | B2 | 3/2004 | Flohr | |
| 6,738,194 | B1 | 5/2004 | Ramirez | |
| 6,742,907 | B2 | 6/2004 | Funamoto et al. | |
| 6,742,921 | B2 | 6/2004 | Umemoto | |
| 6,747,801 | B2 | 6/2004 | Umemoto | |
| 6,751,023 | B2 | 6/2004 | Ariyoshi et al. | |
| 6,760,135 | B1 | 7/2004 | Payne | |
| 6,761,461 | B2 | 7/2004 | Mizutani et al. | |
| 6,773,126 | B1 | 8/2004 | Hatjasalo et al. | |
| 6,774,962 | B2 | 8/2004 | Yoon | |
| 6,778,746 | B2 | 8/2004 | Charlton | |
| 6,792,293 | B1 | 9/2004 | Awan et al. | |
| 6,794,119 | B2 | 9/2004 | Miles | |
| 6,819,380 | B2 | 11/2004 | Wen | |
| 6,822,745 | B2 | 11/2004 | De Groot et al. | |
| 6,829,258 | B1 | 12/2004 | Carlisle | |
| 6,841,787 | B2 | 1/2005 | Almogy | |
| 6,852,396 | B1 | 2/2005 | Mineo | |
| 6,853,418 | B2 | 2/2005 | Suzuki et al. | |
| 6,862,141 | B2 | 3/2005 | Olczak | |
| 6,864,882 | B2 | 3/2005 | Newton | |
| 6,865,312 | B2 | 3/2005 | Niv | |
| 6,879,354 | B1 | 4/2005 | Sawayama | |
| 6,883,924 | B2 | 4/2005 | Maeda et al. | |
| 6,883,934 | B2 | 4/2005 | Kawakami | |
| 6,885,377 | B2 | 4/2005 | Lim | |
| 6,891,530 | B2 | 5/2005 | Umemoto | |
| 6,897,855 | B1 | 5/2005 | Matthies | |
| 6,917,469 | B2 | 7/2005 | Momose | |
| 6,930,816 | B2 | 8/2005 | Mochizuki | |
| 6,951,401 | B2 | 10/2005 | Van Hees et al. | |
| 6,961,045 | B2 | 11/2005 | Tsao | |
| 6,964,484 | B2 | 11/2005 | Gupta | |
| 6,967,779 | B2 | 11/2005 | Fadel et al. | |
| 6,970,031 | B1 | 11/2005 | Martin | |
| 7,002,726 | B2 | 2/2006 | Patel | |
| 7,009,754 | B2 | 3/2006 | Huibers | |
| 7,010,212 | B2 | 3/2006 | Emmons et al. | |
| 7,012,659 | B2 | 3/2006 | Smith et al. | |
| 7,018,088 | B2 | 3/2006 | Yu | |
| 7,025,461 | B2 | 4/2006 | Veligdan et al. | |
| 7,038,752 | B2 | 5/2006 | Lin | |
| 7,042,444 | B2 | 5/2006 | Cok | |
| 7,042,643 | B2 | 5/2006 | Miles | |
| 7,046,409 | B2 | 5/2006 | Kihara | |
| 7,054,045 | B2 | 5/2006 | McPheters | |
| 7,056,001 | B2 | 6/2006 | Chuang | |
| 7,061,226 | B2 | 6/2006 | Durr | |
| 7,064,875 | B2 | 6/2006 | Kawano et al. | |
| 7,072,093 | B2 | 7/2006 | Piehl | |
| 7,072,096 | B2 | 7/2006 | Holman et al. | |
| 7,110,158 | B2 | 9/2006 | Miles | |
| 7,113,339 | B2 | 9/2006 | Taguchi et al. | |

7,123,216 B1 10/2006 Miles
7,133,022 B2 11/2006 Grabert
7,138,984 B1 11/2006 Miles
7,142,347 B2 11/2006 Islam
7,156,546 B2 1/2007 Higashiyama
7,161,136 B1 1/2007 Wenstrand
7,161,730 B2 1/2007 Floyd
7,180,672 B2 2/2007 Olczak
7,206,133 B2 4/2007 Cassarly
7,212,345 B2 5/2007 Wilson
7,218,429 B2 5/2007 Batchko
7,218,812 B2 5/2007 Maxwell
7,221,418 B2 5/2007 Lee
7,223,010 B2 5/2007 Min
7,253,853 B2 8/2007 Imamura
7,262,754 B1 8/2007 Yamazaki
7,262,916 B2 8/2007 Kao
7,324,284 B2 1/2008 Olczak
7,336,329 B2 2/2008 Yoon
7,342,705 B2 3/2008 Chui
7,342,709 B2 3/2008 Lin
7,346,251 B2 3/2008 Bose
7,352,501 B2 * 4/2008 Chopra et al. ............... 359/296
7,352,940 B2 4/2008 Charters
7,355,780 B2 4/2008 Chui
7,357,552 B2 4/2008 Takada
7,357,557 B2 4/2008 Miyashita
7,359,011 B2 4/2008 Hamada
7,360,899 B2 4/2008 McGuire
7,366,393 B2 4/2008 Cassarly
7,369,294 B2 5/2008 Gally
7,377,678 B2 5/2008 Huang
7,380,969 B2 6/2008 Yamashita
7,380,970 B2 6/2008 Hwang
7,389,476 B2 6/2008 Senda et al.
7,417,784 B2 * 8/2008 Sasagawa et al. ........... 359/291
7,450,295 B2 * 11/2008 Tung et al. .................. 359/290
7,456,805 B2 11/2008 Ouderkirk
7,477,809 B1 1/2009 Tan et al.
7,508,571 B2 3/2009 Gally
7,515,336 B2 4/2009 Lippey
7,532,800 B2 5/2009 Iimura
7,545,569 B2 6/2009 Cassarly
7,561,133 B2 7/2009 Mestha
7,564,612 B2 7/2009 Chui
7,588,361 B2 9/2009 Hoelen et al.
7,603,001 B2 10/2009 Wang
7,630,123 B2 12/2009 Kothari
7,663,714 B2 2/2010 Haga et al.
7,706,050 B2 4/2010 Sampsell
7,710,636 B2 5/2010 Chui
7,733,439 B2 6/2010 Sampsell
7,750,886 B2 7/2010 Sampsell
7,760,197 B2 7/2010 Faase
7,766,498 B2 8/2010 Sampsell
7,777,954 B2 8/2010 Gruhlke
2001/0003504 A1 6/2001 Ishihara
2001/0010630 A1 8/2001 Umemoto
2001/0019380 A1 9/2001 Ishihara
2001/0019479 A1 9/2001 Nakabayashi
2001/0022636 A1 9/2001 Yang et al.
2001/0030861 A1 10/2001 Oda
2001/0049061 A1 12/2001 Nakagaki
2001/0055208 A1 12/2001 Kimura
2002/0006036 A1 1/2002 Egawa
2002/0024711 A1 2/2002 Miles
2002/0034071 A1 3/2002 Mabuchi
2002/0044445 A1 4/2002 Bohler
2002/0051354 A1 5/2002 Egawa
2002/0054258 A1 5/2002 Kondo
2002/0054424 A1 5/2002 Miles
2002/0075555 A1 6/2002 Miles
2002/0080465 A1 6/2002 Han
2002/0106182 A1 8/2002 Kawashima
2002/0126364 A1 9/2002 Miles
2002/0131151 A1 9/2002 Engler et al.
2002/0135560 A1 9/2002 Akaoka
2002/0149584 A1 10/2002 Simpson
2002/0154256 A1 10/2002 Gotoh
2002/0172039 A1 11/2002 Inditsky
2003/0012009 A1 1/2003 Suzuki
2003/0016930 A1 1/2003 Inditsky
2003/0030764 A1 2/2003 Lee
2003/0043157 A1 3/2003 Miles
2003/0067760 A1 4/2003 Jagt
2003/0071947 A1 4/2003 Shiraogawa
2003/0081154 A1 5/2003 Coleman
2003/0083429 A1 5/2003 Smith
2003/0086030 A1 5/2003 Taniguchi
2003/0086031 A1 5/2003 Taniguchi
2003/0090887 A1 5/2003 Igarashi
2003/0095401 A1 5/2003 Hanson
2003/0098957 A1 5/2003 Haldiman
2003/0099118 A1 5/2003 Saitoh
2003/0103177 A1 6/2003 Maeda
2003/0103344 A1 6/2003 Niida
2003/0123245 A1 7/2003 Parker
2003/0151821 A1 8/2003 Favalora
2003/0160919 A1 8/2003 Suzuki et al.
2003/0161040 A1 8/2003 Ishii
2003/0169385 A1 9/2003 Okuwaki
2003/0184690 A1 10/2003 Ogiwara
2003/0184989 A1 10/2003 Matsumoto et al.
2003/0193630 A1 10/2003 Chiou
2003/0210222 A1 11/2003 Ogiwara et al.
2003/0210363 A1 11/2003 Yasukawa
2003/0210367 A1 11/2003 Nakano
2003/0214728 A1 11/2003 Olczak
2003/0231483 A1 12/2003 Higashiyama
2004/0001169 A1 1/2004 Saiki
2004/0017599 A1 1/2004 Yang
2004/0027315 A1 2/2004 Senda et al.
2004/0032401 A1 2/2004 Nakazawa
2004/0032659 A1 2/2004 Drinkwater
2004/0042233 A1 3/2004 Suzuki
2004/0070711 A1 4/2004 Wen et al.
2004/0080938 A1 4/2004 Holman
2004/0085748 A1 5/2004 Sugiura
2004/0100796 A1 5/2004 Ward
2004/0109305 A1 6/2004 Chisholm
2004/0125281 A1 7/2004 Lin et al.
2004/0135494 A1 7/2004 Miyatake
2004/0170373 A1 9/2004 Kim
2004/0207995 A1 10/2004 Park
2004/0218390 A1 11/2004 Holman et al.
2004/0228109 A1 11/2004 Leu
2004/0228112 A1 11/2004 Takata
2004/0233357 A1 11/2004 Fujimori
2004/0246743 A1 12/2004 Lee
2005/0010568 A1 1/2005 Nagatomo
2005/0024557 A1 2/2005 Lin
2005/0024849 A1 2/2005 Parker
2005/0030732 A1 2/2005 Kimura
2005/0041175 A1 2/2005 Akiyama
2005/0046011 A1 3/2005 Chen
2005/0069254 A1 3/2005 Schultheis
2005/0120553 A1 6/2005 Brown
2005/0133761 A1 6/2005 Thielemans
2005/0141065 A1 6/2005 Masamoto
2005/0146897 A1 7/2005 Mimura
2005/0195175 A1 9/2005 Anderson
2005/0195468 A1 9/2005 Sampsell
2005/0206802 A1 9/2005 Creemers
2005/0231977 A1 10/2005 Hayakawa
2005/0248524 A1 11/2005 Feng
2005/0253980 A1 11/2005 Saito 2005/0254771 A1 11/2005 Yamashita
2005/0259939 A1 11/2005 Rinko
2005/0271325 A1 12/2005 Anderson
2005/0286113 A1 12/2005 Miles
2006/0001942 A1 1/2006 Chui
2006/0002141 A1 1/2006 Ouderkirk et al.
2006/0002675 A1 1/2006 Choi
2006/0024017 A1 2/2006 Page
2006/0044523 A1 3/2006 Teijido
2006/0050032 A1 3/2006 Gunner
2006/0051048 A1 3/2006 Gardiner
2006/0061705 A1 3/2006 Onishi
2006/0062016 A1 3/2006 Dejima
2006/0066541 A1 3/2006 Gally
2006/0066586 A1 3/2006 Gally
2006/0066783 A1 3/2006 Sampsell
2006/0066935 A1 3/2006 Cummings et al.
2006/0067600 A1 3/2006 Gally
2006/0072315 A1 4/2006 Han et al.
2006/0072339 A1 4/2006 Li et al.
2006/0077123 A1 4/2006 Gally
2006/0077124 A1 4/2006 Gally
2006/0077154 A1 4/2006 Gally
2006/0077522 A1 4/2006 Kothari
2006/0083028 A1 4/2006 Sun et al.
2006/0109682 A1 5/2006 Ko et al.
2006/0110090 A1 5/2006 Ellwood
2006/0114244 A1 6/2006 Saxena
2006/0126142 A1 6/2006 Choi
2006/0132383 A1* 6/2006 Gally et al. .................. 345/32
2006/0146575 A1 7/2006 Saito
2006/0164861 A1 7/2006 Maeda
2006/0181866 A1 8/2006 Jung
2006/0181903 A1 8/2006 Okuwaki
2006/0187676 A1 8/2006 Ishikura
2006/0198013 A1 9/2006 Sampsell
2006/0209012 A1 9/2006 Hagood
2006/0209385 A1 9/2006 Liu
2006/0215958 A1 9/2006 Yeo
2006/0227532 A1 10/2006 Ko et al.
2006/0262562 A1 11/2006 Fukasawa
2006/0265919 A1 11/2006 Huang
2006/0268574 A1 11/2006 Jung
2006/0274400 A1 12/2006 Miles
2006/0285356 A1 12/2006 Tseng
2007/0064294 A1 3/2007 Hoshino et al.
2007/0081360 A1 4/2007 Bailey
2007/0116424 A1 5/2007 Ting
2007/0133226 A1 6/2007 Mi
2007/0133935 A1 6/2007 Fine
2007/0147087 A1 6/2007 Parker
2007/0153243 A1 7/2007 Mestha et al.
2007/0171330 A1 7/2007 Hung
2007/0171418 A1 7/2007 Nyhart
2007/0177405 A1 8/2007 Chan
2007/0187852 A1 8/2007 Parker et al.
2007/0189036 A1 8/2007 Chen
2007/0196040 A1 8/2007 Wang
2007/0201234 A1 8/2007 Ottermann
2007/0210163 A1 9/2007 Han
2007/0229737 A1 10/2007 Takeda
2007/0229936 A1 10/2007 Miles
2007/0241340 A1 10/2007 Pan
2007/0253717 A1 11/2007 Charters
2007/0268695 A1 11/2007 Seetzen
2007/0279727 A1 12/2007 Gandhi
2007/0279935 A1 12/2007 Gardiner
2007/0285406 A1 12/2007 Kukulj
2007/0292091 A1 12/2007 Fujii
2007/0297191 A1 12/2007 Sampsell
2008/0049445 A1 2/2008 Harbers
2008/0049450 A1 2/2008 Sampsell
2008/0074402 A1 3/2008 Cornish
2008/0079687 A1 4/2008 Cernasov
2008/0084600 A1 4/2008 Bita et al.
2008/0084602 A1 4/2008 Xu et al.
2008/0090025 A1 4/2008 Freking
2008/0094853 A1 4/2008 Kim
2008/0112039 A1 5/2008 Chui
2008/0137175 A1 6/2008 Lin
2008/0151347 A1 6/2008 Chui
2008/0180956 A1 7/2008 Gruhlke
2008/0232135 A1 9/2008 Kinder
2008/0267572 A1 10/2008 Sampsell
2009/0050454 A1 2/2009 Matsukawa
2009/0097100 A1 4/2009 Gally
2009/0126777 A1 5/2009 Khazeni et al.
2009/0126792 A1 5/2009 Gruhlke
2009/0147332 A1 6/2009 Bita et al.
2009/0147535 A1 6/2009 Mienko
2009/0168459 A1 7/2009 Holman
2009/0190373 A1 7/2009 Bita et al.
2009/0199893 A1 8/2009 Bita
2009/0199900 A1 8/2009 Bita
2009/0201301 A1 8/2009 Mienko
2009/0201565 A1 8/2009 Bita et al.
2009/0201571 A1 8/2009 Gally
2009/0231877 A1 9/2009 Mienko
2009/0251752 A1 10/2009 Gruhlke
2009/0251783 A1 10/2009 Huibers
2009/0296193 A1 12/2009 Bita et al.
2009/0303746 A1 12/2009 Wang
2009/0310208 A1 12/2009 Wang
2009/0320899 A1 12/2009 Schiavoni
2009/0323144 A1 12/2009 Gruhlke
2009/0323153 A1 12/2009 Sampsell
2010/0026727 A1 2/2010 Bita et al.
2010/0051089 A1 3/2010 Khazeni
2010/0053148 A1 3/2010 Khazeni
2010/0141557 A1 6/2010 Gruhlke
2010/0149624 A1 6/2010 Kothari
2010/0157406 A1 6/2010 Gruhlke
2010/0165443 A1 7/2010 Chui
2010/0177533 A1 7/2010 Griffiths
2010/0182308 A1 7/2010 Holman

FOREIGN PATENT DOCUMENTS

CN 1286424 3/2001
CN 1381752 A 11/2002
CN 1639596 A 7/2005
CN 1755494 A 4/2006
CN 1795403 A 6/2006
DE 34 02 746 8/1985
DE 196 22 748 12/1997
DE 199 42 513 3/2001
DE 102 28 946 1/2004
EP 0 278 038 8/1988
EP 0 539 099 4/1993
EP 0 590 511 4/1994
EP 0 621 500 10/1994
EP 0 822 441 2/1998
EP 0 879 991 11/1998
EP 0 907 050 4/1999
EP 0 957 392 11/1999
EP 0 984 314 3/2000
EP 1 079 264 2/2001
EP 1 081 633 3/2001
EP 1 093 105 4/2001
EP 1 113 218 7/2001
EP 1 116 987 7/2001
EP 1 122 586 8/2001
EP 1 127 984 8/2001
EP 1 143 270 10/2001
EP 1 199 512 4/2002
EP 1 251 454 4/2002

| | | | |
|---|---|---|---|
| EP | 1 271 223 | | 6/2002 |
| EP | 1 279 892 | | 1/2003 |
| EP | 1 296 094 | | 3/2003 |
| EP | 1 306 609 | | 5/2003 |
| EP | 1 329 664 | | 7/2003 |
| EP | 1 336 876 | | 8/2003 |
| EP | 1 347 315 | | 9/2003 |
| EP | 1 389 775 | | 2/2004 |
| EP | 1 413 543 | | 4/2004 |
| EP | 1 437 610 | | 7/2004 |
| EP | 1 445 629 | | 8/2004 |
| EP | 1 519 218 | | 3/2005 |
| EP | 1 531 302 | | 5/2005 |
| EP | 1 544 537 | | 6/2005 |
| EP | 1 577 701 | | 9/2005 |
| EP | 1 640 764 | | 3/2006 |
| EP | 1 640 961 | | 3/2006 |
| EP | 1 698 918 | | 9/2006 |
| EP | 1 732 141 | A | 12/2006 |
| EP | 1 734 401 | | 12/2006 |
| EP | 1 748 305 | | 1/2007 |
| EP | 1 762 778 | A | 3/2007 |
| EP | 1 832 806 | | 9/2007 |
| EP | 1 870 635 | | 12/2007 |
| EP | 2 061 092 | A1 | 5/2009 |
| EP | 2 061 093 | A1 | 5/2009 |
| GB | 2 260 203 | | 4/1993 |
| GB | 2 278 222 | | 11/1994 |
| GB | 2321532 | | 7/1998 |
| GB | 2 336 933 | | 3/1999 |
| GB | 2 331 615 | | 5/1999 |
| GB | 2 340 281 | | 2/2000 |
| GB | 2 351 834 | | 1/2001 |
| JP | 60 242408 | | 12/1985 |
| JP | 62-009317 | | 1/1987 |
| JP | 04-081816 | | 3/1992 |
| JP | 05 281479 | | 10/1993 |
| JP | 07-509327 | | 10/1995 |
| JP | 09 022012 | | 1/1997 |
| JP | 09 160032 | | 6/1997 |
| JP | 09-507920 | | 8/1997 |
| JP | 09 307140 | | 11/1997 |
| JP | 09 311333 | | 12/1997 |
| JP | 11 160687 | | 6/1999 |
| JP | 11 174234 | | 7/1999 |
| JP | 11 211999 | | 8/1999 |
| JP | 11 231321 | | 8/1999 |
| JP | 11 232919 | | 8/1999 |
| JP | 2000 075293 | | 3/2000 |
| JP | 2000 081848 | | 3/2000 |
| JP | 2000 181367 | | 6/2000 |
| JP | 2000 514568 | | 10/2000 |
| JP | 2000 193933 | | 11/2000 |
| JP | 2000 305074 | | 11/2000 |
| JP | 2001-021883 | | 1/2001 |
| JP | 2001 305312 | | 10/2001 |
| JP | 2001 343514 | | 12/2001 |
| JP | 2002 72284 | | 3/2002 |
| JP | 2002 090549 | | 3/2002 |
| JP | 2002-108227 | | 4/2002 |
| JP | 2002 174780 | | 6/2002 |
| JP | 2002 196151 | | 7/2002 |
| JP | 2002 245835 | | 8/2002 |
| JP | 2002-297044 | | 10/2002 |
| JP | 2003 007114 | | 1/2003 |
| JP | 2003 057652 | | 2/2003 |
| JP | 2003 066451 | | 3/2003 |
| JP | 2003 173713 | | 6/2003 |
| JP | 2003-188959 | | 7/2003 |
| JP | 2003-315694 | | 11/2003 |
| JP | 2003 344881 | | 12/2003 |
| JP | 2004-012918 | | 1/2004 |
| JP | 2004-062099 | | 2/2004 |
| JP | 2004-510185 | | 4/2004 |
| JP | 2004-206049 | | 7/2004 |
| JP | 2005-259365 | | 9/2005 |
| JP | 2006-065360 | A | 3/2006 |
| JP | 2006 107993 | | 4/2006 |
| JP | 2006 120571 | | 5/2006 |
| TW | 567388 | | 12/2003 |
| WO | WO 94/06871 | A1 | 3/1994 |
| WO | WO 95/01584 | | 1/1995 |
| WO | WO 95/14256 | | 5/1995 |
| WO | WO 96/16348 | | 5/1996 |
| WO | WO 97/01240 | | 1/1997 |
| WO | WO 97/17628 | | 5/1997 |
| WO | WO 98/19201 | | 5/1998 |
| WO | WO 98/32047 | | 7/1998 |
| WO | WO 98/35182 | | 8/1998 |
| WO | WO 99/04296 | A | 1/1999 |
| WO | WO 99/63394 | | 12/1999 |
| WO | WO 99/64785 | A | 12/1999 |
| WO | WO 00/50807 | | 8/2000 |
| WO | WO 01/29148 | | 4/2001 |
| WO | WO 01/57434 | | 8/2001 |
| WO | WO 01/81994 | | 11/2001 |
| WO | WO 01/84228 | | 11/2001 |
| WO | WO 01/84229 | | 11/2001 |
| WO | WO 02/06858 | | 1/2002 |
| WO | WO 02/071132 | | 9/2002 |
| WO | WO 02/097324 | | 12/2002 |
| WO | WO 03/007049 | | 1/2003 |
| WO | WO 03/032058 | | 4/2003 |
| WO | WO 03/038509 | | 5/2003 |
| WO | WO 03/056876 | | 7/2003 |
| WO | WO 03/062912 | | 7/2003 |
| WO | WO 03/075207 | | 9/2003 |
| WO | WO 2004/003643 | | 1/2004 |
| WO | WO 2004/006003 | | 1/2004 |
| WO | WO 2004/015489 | | 2/2004 |
| WO | WO 2004/027514 | | 4/2004 |
| WO | WO 2004/036270 | | 4/2004 |
| WO | WO 2004/088372 | | 10/2004 |
| WO | WO 2004/114418 | | 12/2004 |
| WO | WO 2005/011012 | | 2/2005 |
| WO | WO 2005/076051 | | 8/2005 |
| WO | WO 2005/088367 | | 9/2005 |
| WO | WO 2005/093490 | | 10/2005 |
| WO | WO 2005/111669 | | 11/2005 |
| WO | WO 2006/008702 | | 1/2006 |
| WO | WO 2006/036451 | | 4/2006 |
| WO | WO 2006/036496 | | 4/2006 |
| WO | WO 2007/094558 | | 8/2007 |
| WO | WO 2007/149474 | | 12/2007 |
| WO | WO 2008/027275 | | 3/2008 |
| WO | WO 2008/045200 | | 4/2008 |
| WO | WO 2008/045207 | | 4/2008 |
| WO | WO 2008/045218 | | 4/2008 |
| WO | WO 2008/045222 | | 4/2008 |
| WO | WO 2008/045224 | | 4/2008 |
| WO | WO 2008/045310 | | 4/2008 |
| WO | WO 2008/045311 | | 4/2008 |
| WO | WO 2008/045312 | | 4/2008 |
| WO | WO 2008/045362 | | 4/2008 |
| WO | WO 2008/045363 | | 4/2008 |
| WO | WO 2008/045364 | | 4/2008 |
| WO | WO 2008/069877 | | 6/2008 |

OTHER PUBLICATIONS

Magel, "Integrated Optic Devices Using Micromachined Metal Membranes", SPIE vol. 2686, 0-8194-2060-3/1996.

Mehregany et al., "MEMS Applications in Optical Systems", IEEE/LEOS 1996 Summer Topical Meetings, pp. 75-76, (Aug. 5-9, 1996).

Tai, C.Y. et al., "A Transparent Front Lighting System for Reflective-type Displays," 1995 SID International Symposium Digest of Technical Papers, Orlando, May 23-25, 1995, SID International Symposium Digest of Technical Papers, Santa Ana, SID, US vol. 26, May 23, 1995. pp. 375-378.
Zhou et al., "Waveguide Panel Display Using Electromechanism Spatial Modulators" SID Digest, vol. XXIX, 1998.
ISR and WO in PCT/US2007/014358 mailed on Dec. 13, 2007.
Partial International Search Report for PCT/US2007/022736 dated Jun. 16, 2008 (PCT Publication No. WO 2008/069877).
International Search Report for PCT/US2007/022736 dated Aug. 14, 2008 (PCT Publication No. WO 2008/069877).
Austrian Search Report for U.S. Appl. No. 11/064,143 dated Aug. 12, 2005 (Publication No. 2006/0132383).
Partial Search Report in European Patent Application No. 05255638.8 (European Publication 1 640 764) mailed on Jan. 25, 2006.
Extended Search Report in European Patent Application No. 05255638.8 (European Publication 1 640 764) mailed on May 4, 2006.
ISR and Written Opinion for PCT/US2007/018639 dated Mar. 20, 2008 (PCT Publication No. WO 2008/027275).
ISR and WO for PCT/US2007/020969 dated Mar. 5, 2008 (PCT Publication WO 2008/045222).
ISR and Written Opinion for PCT/US2007/020911 dated Mar. 18, 2008 (PCT Publication No. WO 2008/045218).
ISR and WO for PCT/US2007/020680 dated Jul. 1, 2008 (PCT Publication WO 2008/045200).
ISR and WO for PCT/US2007/020736 dated Jul. 14, 2008 (PCT Publication No. WO 2008/045207).
ISR and Written Opinion for PCT/US2007/021378 dated Mar. 5, 2008 (PCT Publication No. WO 2008/045312).
ISR and WO for PCT/US2007/021376 dated Jun. 18, 2008 (PCT Publication No. WO 2008/045311).
ISR and Written Opinion for PCT/US2007/021460 dated May 14, 2008 (PCT Publication No. WO 2008/045364).
ISR and WO mailed on Dec. 13, 2007 in PCT/US2007/014385 (WO 2007/149474).
ISR and Written Opinion for PCT/US2007/021459 dated May 14, 2008 (PCT Publication No. WO 2008/045363).
ISR and Written Opinion for PCT/US2007/021375 dated May 14, 2008 (PCT Publication No. WO 2008/045310).
ISR and Written Opinion for PCT/US2007/021458 dated May 14, 2008 (PCT Publication No. WO 2008/045362).
ISR and Written Opinion for PCT/US2007/020999 dated Apr. 8, 2008 (PCT Publication No. WO 2008/045224).
ISR for PCT/US2005/006629 dated Jun. 6, 2005 (PCT Publication No. WO 2005/093490).
International Preliminary Report on Patentability in Application No. PCT/US2007/022736, dated Feb. 5, 2009.
Office Action in U.S. Appl. No. 11/417,808 mailed Jun. 14, 2006.
Fan et al., "Channel Drop Filters in Photonic Crystals", Optics Express, vol. 3, No. 1, pp. 4-11, 1998.
Little et al., "Vertically Coupled Microring Rosonator Channel Dropping Filter", IEEE Photonics Technology Letters, vol. 11, No. 2, pp. 215-217, 1999.
Miles, M., et. al., "Digital Paper™ for reflective displays," Journal of the Society for Information Display, Society for Information Display, San Jose, US, vol. 11, No. 1, pp. 209-215, 2003.
Oliner, "Radiating Elements and Mutual Coupling," Microwave Scanning Antennas, vol. 2, pp. 131-157 and pp. 190-194, 1966.
Notice of Allowance in U.S. Appl. No. 11/417,808, dated May 19, 2010.
Request for Continued Examination in U.S. Appl. No. 11/417,808, dated Aug. 18, 2010.
Imenes et al., "Spectral beam splitting technology for increased conversion efficiency in solar concentrating systems: a review" Solar Energy Materials, Elsevier Science Publishers B.V. Amsterdam, NL, vol. 84, Oct. 1, 2004, pp. 19-69, XP002474546.
OSRAM Opto Semiconductors, "Multi Micro SIDELED," Preliminary Data, Dec. 11, 2008.
Yan, et al., "Edge-Lighting Light Guide Plate Based on Micro-Prism for Liquid Crystal Display," Journal of Display Technology, vol. 5, No. 9, pp. 355-357, Sep. 2009.
Yu, et al., "Design Optimization and Stamper Fabrication of Light Guiding Plates Using Silicon Based Micro-Features," IEEE Symposium on DTIP of MEMS/MOEMS, Rome, Apr. 1-3, 2009.

* cited by examiner

UV exposure to deactivate coating
100''''

| Row Output Signals | Column Output Signals: $+V_{bias}$ | Column Output Signals: $-V_{bias}$ |
|---|---|---|
| 0 | Stable | Stable |
| $+\Delta V$ | Relax | Actuate |
| $-\Delta V$ | Actuate | Relax |

LIGHT GUIDE INCLUDING OPTICAL SCATTERING ELEMENTS AND A METHOD OF MANUFACTURE

FIELD OF THE INVENTION

The present invention relates generally to displays and more specifically to light guides for such displays.

BACKGROUND OF THE INVENTION

Microelectromechanical systems (MEMS) include micro mechanical elements, actuators, and electronics. Micromechanical elements may be created using deposition, etching, and or other micromachining processes that etch away parts of substrates and/or deposited material layers or that add layers to form electrical and electromechanical devices. One type of MEMS device is called an interferometric modulator. As used herein, the term interferometric modulator or interferometric light modulator refers to a device that selectively absorbs and/or reflects light using the principles of optical interference. In certain embodiments, an interferometric modulator may comprise a pair of conductive plates, one or both of which may be transparent and/or reflective in whole or part and capable of relative motion upon application of an appropriate electrical signal. In a particular embodiment, one plate may comprise a stationary layer deposited on a substrate and the other plate may comprise a metallic membrane separated from the stationary layer by an air gap. As described herein in more detail, the position of one plate in relation to another can change the optical interference of light incident on the interferometric modulator. Such devices have a wide range of applications, and it would be beneficial in the art to utilize and/or modify the characteristics of these types of devices so that their features can be exploited in improving existing products and creating new products that have not yet been developed. One area where constant improvement is needed is the light guides which are utilized in the flat panel displays.

Current light technologies for reflective flat panel displays are relatively expensive and difficult to fabricate. In a conventional approach, a light guide consists of two pieces of glass fastened together with a sealing agent, such as a bead of epoxy between the two pieces of glass. In the conventional approach, a piece of plastic is fabricated which has a "stairstep" pattern on it. A light guide is attached to the edge of this discrete piece of plastic, and the light is bounced through the plastic. At certain points where the light hits the stairstep structure the light will bounce down into the display.

The "stairstep" features on such a piece of glass require a manufacturing process which is very difficult to utilize using low cost molding methods. What is generally required is to make an expensive molding tool, which can then only be used for fabricating a limited number of parts. The light is very sensitive to the level of defects which may result from the "stairstep" feature. If defects such as a particle in the mold, or a burr in the mold occur, such defects will appear as optical defects to the viewer. Ghosting effects may also result, or double images, as a result of this conventional manufacturing process.

Accordingly, what is needed is a system and method for overcoming the above-mentioned problems. The present invention addresses such a need.

SUMMARY OF THE INVENTION

A method and system for fabricating a light guide is disclosed. The method and system comprise providing a light guide element which includes a plurality of scattering elements located therein and adjusting at least a portion of the scattering elements to maintain their optical scattering character.

The present invention provides a system and method for fabricating a lighting technology that is inexpensive and can compete on a cost basis with LCD backlight technologies while maintaining reasonable performance.

DETAILED DESCRIPTION

The following detailed description is directed to certain specific embodiments of the invention. However, the invention can be embodied in a multitude of different ways. In this description, reference is made to the drawings wherein like parts are designated with like numerals throughout. As will be apparent from the following description, the embodiments may be implemented in any device that is configured to display an image, whether in motion (e.g., video) or stationary (e.g., still image), and whether textual or pictorial. More particularly, it is contemplated that the embodiments may be implemented in or associated with a variety of electronic devices such as, but not limited to, mobile telephones, wireless devices, personal data assistants (PDAs), hand-held or portable computers, GPS receivers/navigators, cameras, MP3 players, camcorders, game consoles, wrist watches, clocks, calculators, television monitors, flat panel displays, computer monitors, auto displays (e.g., odometer display, etc.), cockpit controls and/or displays, display of camera views (e.g., display of a rear view camera in a vehicle), electronic photographs, electronic billboards or signs, projectors, architectural structures, packaging, and aesthetic structures (e.g., display of images on a piece of jewelry). MEMS devices of similar structure to those described herein can also be used in non-display applications such as in electronic switching devices.

Figure 1:
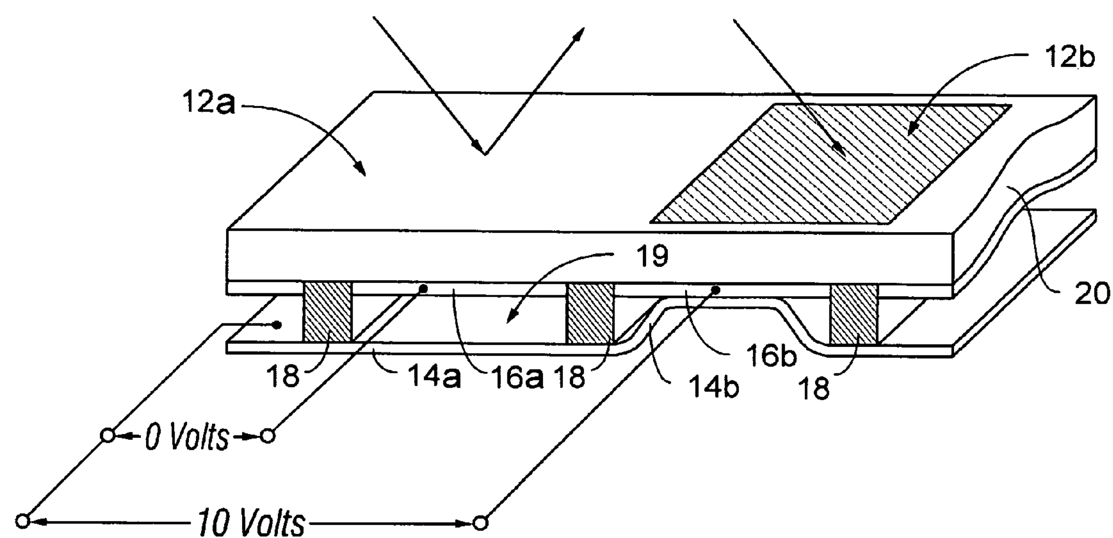
FIG. 1 is an isometric view depicting a portion of one embodiment of an interferometric modulator display in which a movable reflective layer of a first interferometric modulator is in a relaxed position and a movable reflective layer of a second interferometric modulator is in an actuated position.

One interferometric modulator display embodiment comprising an interferometric MEMS display element is illustrated in FIG. 1. In these devices, the pixels are in either a bright or dark state. In the bright ("on" or "open") state, the display element reflects a large portion of incident visible light to a user. When in the dark ("off" or "closed") state, the display element reflects little incident visible light to the user. Depending on the embodiment, the light reflectance properties of the "on" and "off" states may be reversed. MEMS pixels can be configured to reflect predominantly at selected colors, allowing for a color display in addition to black and white.

FIG. 1 is an isometric view depicting two adjacent pixels in a series of pixels of a visual display, wherein each pixel comprises a MEMS interferometric modulator. In some embodiments, an interferometric modulator display comprises a row/column array of these interferometric modulators. Each interferometric modulator includes a pair of reflective layers positioned at a variable and controllable distance from each other to form a resonant optical gap with at least one variable dimension. In one embodiment, one of the reflective layers may be moved between two positions. In the first position, referred to herein as the relaxed position, the movable reflective layer is positioned at a relatively large distance from a fixed partially reflective layer. In the second position, referred to herein as the actuated position, the movable reflective layer is positioned more closely adjacent to the partially reflective layer. Incident light that reflects from the two layers interferes constructively or destructively depending on the position of the movable reflective layer, producing either an overall reflective or non-reflective state for each pixel.

The depicted portion of the pixel array in FIG. 1 includes two adjacent interferometric modulators 12*a* and 12*b*. In the interferometric modulator 12*a* on the left, a movable reflective layer 14*a* is illustrated in a relaxed position at a predetermined distance from an optical stack 16*a*, which includes a partially reflective layer. In the interferometric modulator 12*b* on the right, the movable reflective layer 14*b* is illustrated in an actuated position adjacent to the optical stack 16*b*.

The optical stacks 16*a* and 16*b* (collectively referred to as optical stack 16), as referenced herein, typically comprise of several fused layers, which can include an electrode layer, such as indium tin oxide (ITO), a partially reflective layer, such as chromium, and a transparent dielectric. The optical stack 16 is thus electrically conductive, partially transparent and partially reflective, and may be fabricated, for example, by depositing one or more of the above layers onto a transparent substrate 20. The partially reflective layer can be formed from a variety of materials that are partially reflective such as various metals, semiconductors, and dielectrics. The partially reflective layer can be formed of one or more layers of materials, and each of the layers can be formed of a single material or a combination of materials.

In some embodiments, the layers of the optical stack are patterned into parallel strips, and may form row electrodes in a display device as described further below. The movable reflective layers 14*a*, 14*b* may be formed as a series of parallel strips of a deposited metal layer or layers (orthogonal to the row electrodes of 16*a*, 16*b*) deposited on top of posts 18 and an intervening sacrificial material deposited between the posts 18. When the sacrificial material is etched away, the movable reflective layers 14*a*, 14*b* are separated from the optical stacks 16*a*, 16*b* by a defined gap 19. A highly conductive and reflective material such as aluminum may be used for the reflective layers 14, and these strips may form column electrodes in a display device.

With no applied voltage, the gap 19 remains between the movable reflective layer 14*a* and optical stack 16*a*, with the movable reflective layer 14*a* in a mechanically relaxed state, as illustrated by the pixel 12*a* in FIG. 1. However, when a potential difference is applied to a selected row and column, the capacitor formed at the intersection of the row and column electrodes at the corresponding pixel becomes charged, and electrostatic forces pull the electrodes together. If the voltage is high enough, the movable reflective layer 14 is deformed and is forced against the optical stack 16. A dielectric layer (not illustrated in this Figure) within the optical stack 16 may prevent shorting and control the separation distance between layers 14 and 16, as illustrated by pixel 12*b* on the right in FIG. 1. The behavior is the same regardless of the polarity of the applied potential difference. In this way, row/column actuation that can control the reflective vs. non-reflective pixel states is analogous in many ways to that used in conventional LCD and other display technologies.

This type of system utilizes a light guide element thereon as part of the optical stack of the reflective display. A system and method in accordance with the present invention provides an improved light guide element that is easy to fabricate and cost effective. To describe the features of the light guide element in more detail refer now to the following description in conjunction with the accompanying Figures.

The present invention provides for fabricating a light guide which is cheaper, more robust and more efficient for reflective display than existing technologies. The method of fabrication described in the present invention simplifies the manufacturing process, which is expensive with conventional technology because of the difficulty in fabricating very fine features on the light guide. As before mentioned, such conventional processes require expensive molding tools which can only be used a limited number of times. As a result of the method described in the present invention, less expensive fabricating processes may be utilized. Thinner light guides are also possible, creating more flexibility for product design and less weight and bulk.

Figure 2A:
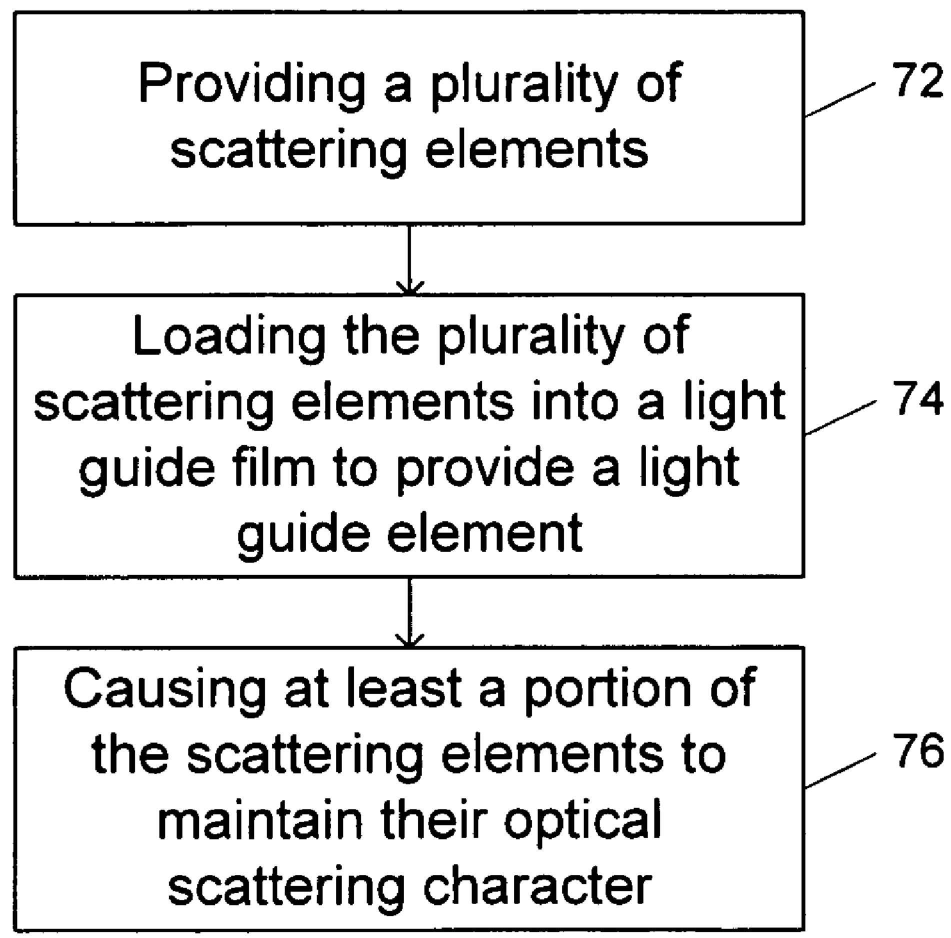
FIG. 2A is a simple flow chart of a method for fabricating a light guide element in accordance with the present invention.

The present invention provides a method for fabricating a light guide element including optical scattering elements. In one embodiment of the present invention, the scattering elements are embedded in the bulk of the light guide material or the bulk of the film that will be applied to the display substrate. FIG. 2A is a simple flow chart of a method for fabricating a light guide element in accordance with the present invention. First, a plurality of scattering elements are provided, via step 72. Next, the plurality of scattering elements is loaded into a light guide film to provide a light guide element, via step 74. Finally, at least a portion of the scattering elements are adjusted to maintain their optical scattering character, via step 76.

The scattering elements could be a variety of elements including but not limited to highly reflective polymers or metals, such as silver, aluminum, nickel, chrome or the like which inherently have optical scattering characteristics. In another example the scattering elements could be comprised of $TiO_2$ that is coated with a photochromic coating that is activated in some manner to adjust the scattering elements optical scattering direction.

In one embodiment, the scattering elements are coated with a photochromic coating that forms a black mask when exposed to UV. By exposing the display side of the light control film or front light guide, the side of the scattering elements facing the display array maintain their optical scattering character while the display side forms a black mask. To describe the features of the embodiment in more detail, refer now to the following description in conjunction with the accompanying figures.

Figure 2B:
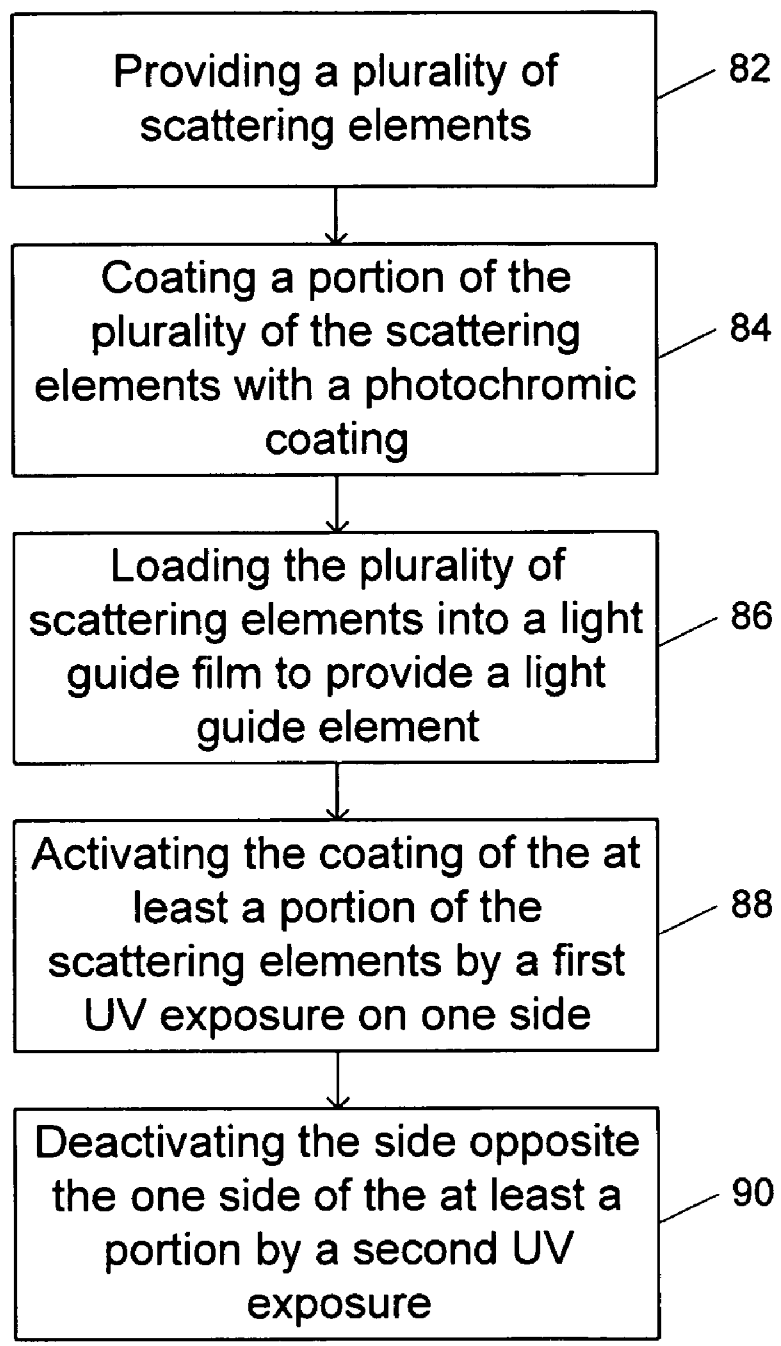
FIG. 2B is a flow chart of a method for fabricating a light guide in accordance with the present invention.

FIG. 2B is a flow chart of a method for fabricating a light guide in accordance with the present invention. First, a plurality of optical scattering elements are provided, via step 82. The scattering elements for example could be comprised of $TiO_2$. A portion of the plurality of scattering elements is coated with a photochromic coating, via step 84. The photochromic coating could be for example, in the classes of triarylmethanes, stilbenes, azastilbenes, nitrones, fulgides, spiropyrans, naphthopyrans, spiro-oxazines, and the like. The plurality of scattering elements are loaded into a light guide film to provide a light guide element, via step 86. Thereafter, the coating of the at least a portion of scattering elements is activated by a first UV exposure on one side to darken and form a mask on the one side, via step 88. The first UV exposure may be within a first range of wavelengths such as 300-400 nanometers. A second UV exposure is provided to the side opposite of the one side to deactivate the coating on the side opposite and ensure that it will not darken, via step 90. The second UV exposure may be within a second range of wavelengths such as 300-400 nanometers such that the second UV exposure is different from the first exposure.

Figure 3:
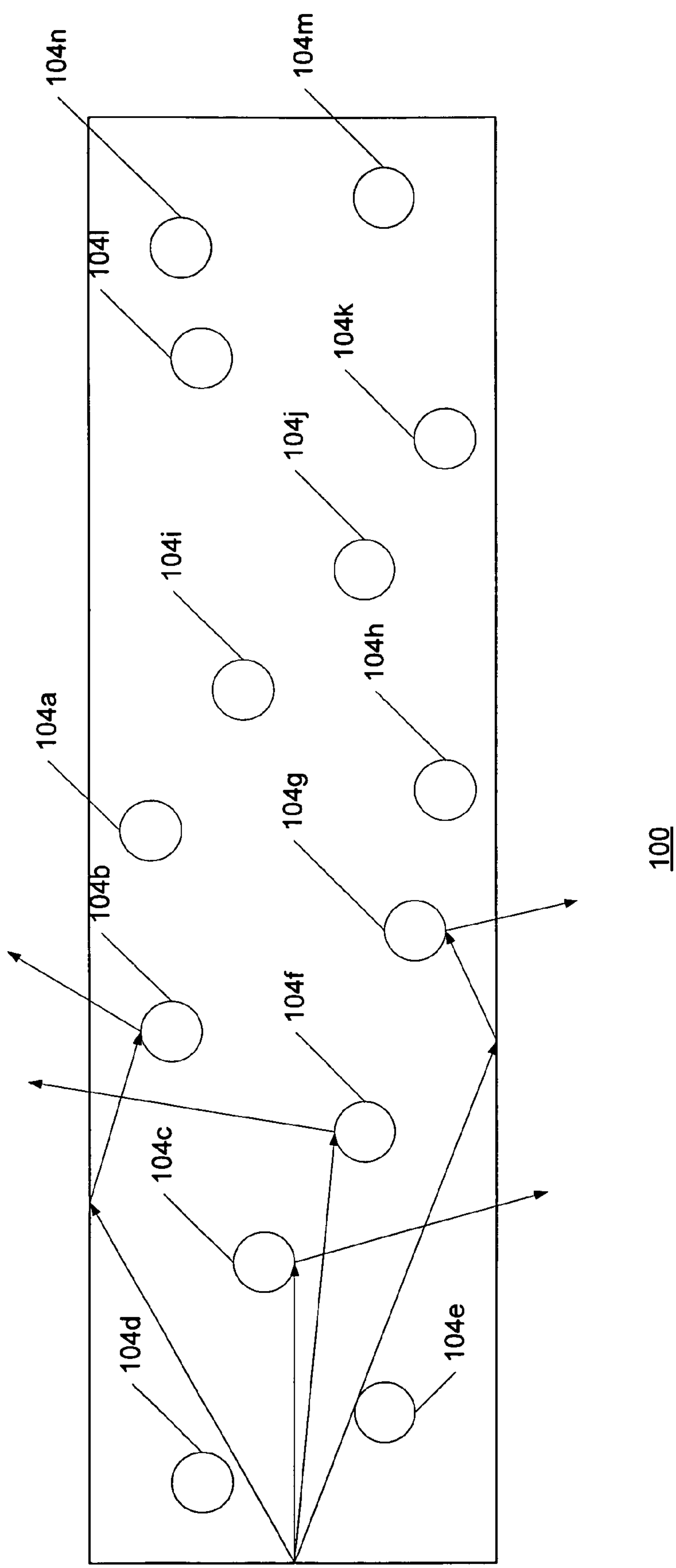
FIG. 3 shows a light guide film loaded with scattering elements where there is no preferential direction for light output elements.

A method and system in accordance with the present invention allows for the fragile “stairstep” utilized in the conventional approach to be eliminated. FIG. 3 shows a light guide film 100 loaded with scattering elements where there is no preferential direction for light output. As is seen, a thin relatively flat sheet is fabricated, and then filled with reflective particles, the scattering elements 104. The elimination of the “stairstep” pattern as before mentioned allows for much thinner plastic to be utilized, from 0.5 to 1.0 millimeters, for example. Utilization of the thinner plastic eliminates the need to build a very fine mold, and instead allows for building a flat mold or injection mold, compression mold, spincasting, extrusion molding, blow molding or other molding processes, thereby allowing a more cost-efficient manufacturing process.

Figure 4A:
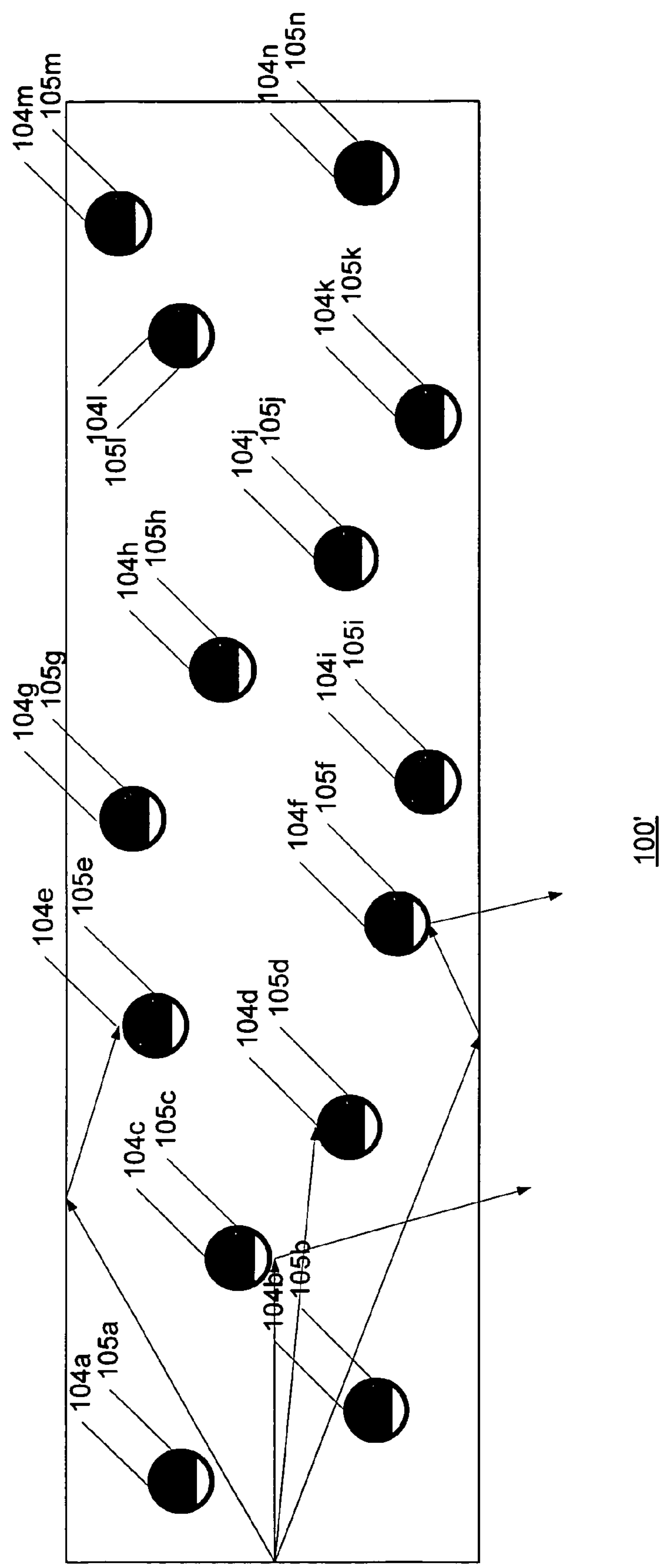
FIG. 4A shows one embodiment of a light guide element loaded with scattering elements in accordance with the present invention.

In an embodiment in accordance with the present invention, the scattering elements are embedded in the bulk of the light guide material or the bulk of the film that will be applied to the display substrate. FIG. 4A shows a first embodiment of a light guide element 100' loaded with scattering elements 104$a$-$n$ in accordance with the present invention. In this embodiment, the top portion 105$a$-$n$ of the scattering elements is masked, so that the top portion 105$a$-$n$ of the scattering elements absorb the light. Varying percentages of masking could be utilized. The scattering elements 104$a$-$n$ should be distributed in a random fashion for maximum effect. In another embodiment of the present invention, for example, a portion of scattering elements 104$a$-$n$ might be masked at 10% coverage, another portion of scattering elements at 40% coverage, and another portion of scattering elements 104$a$-$n$ might be masked at 70% coverage. Other percentages of masking might also be utilized in conjunction with one another, the masked scattering elements of varying coverage randomly dispersed among each other.

Figure 4B:
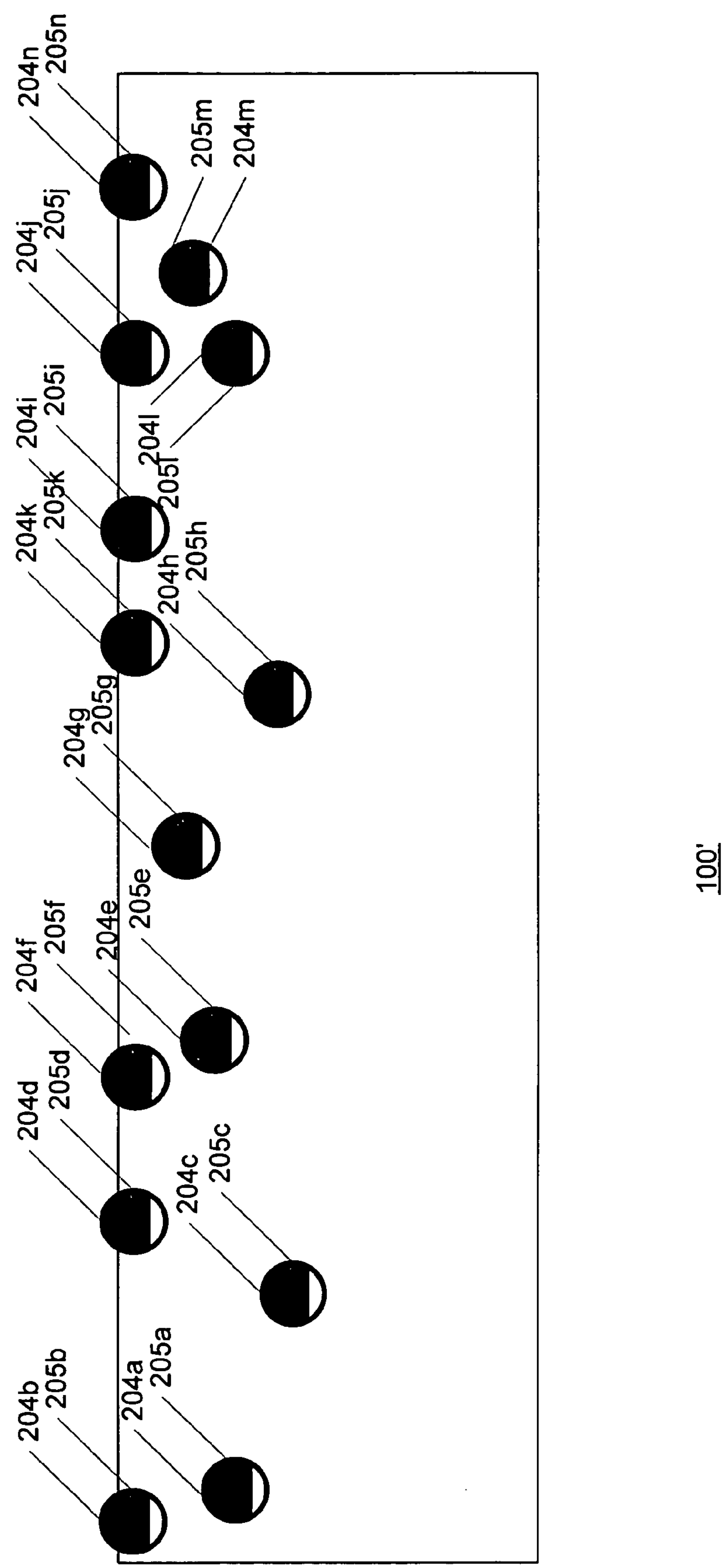
FIG. 4B shows a second embodiment of a light guide element loaded with scattering elements in accordance with the present invention.

FIG. 4B shows a second embodiment of a light guide element 100' with scattering elements 204$a$-$n$. As is seen, some of scattering elements 204$a$-$n$ are within the light guide and some protrude from a top portion. One of skill in the art will recognize that scattering elements 204 may all protrude from the surface of the light guide element 100' (rather than some buried and some protruding, as illustrated in FIG. 4B), with more or less of each scattering element 204 protruding from the surface than is illustrated in FIG. 4B. For example, FIG. 4B illustrates each scattering element 204 having more surface area inside of light guide 100' than outside, however in other embodiments there may be an equal amount of surface area of a scattering element 204 inside and outside the light guide 100', or there may be more surface area of a scattering element 204 outside of the light guide 100' rather than inside.

Figure 4C:
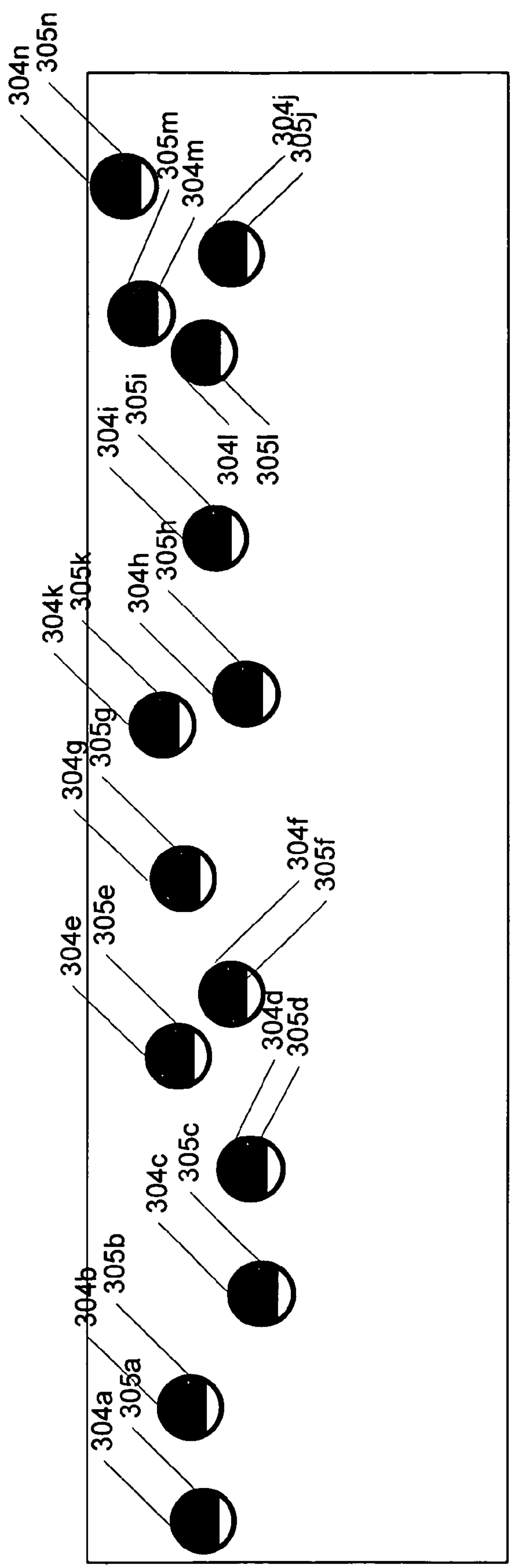
FIG. 4C shows a third embodiment of a light guide element loaded with scattering elements in accordance with the present invention.

FIG. 4C shows a third embodiment of a light guide element 100' with scattering elements 304$a$-$n$. As is seen, all of the scattering elements 304$a$-$n$ in this third embodiment are located within the top portion of the light guide 100'. All of the above-described embodiments can be utilized to provide the appropriate light output. One of ordinary skill in the art readily recognizes that a variety of types of scattering elements could be utilized in a variety of configurations and their use would be within the spirit and scope of the present invention.

Figure 5:
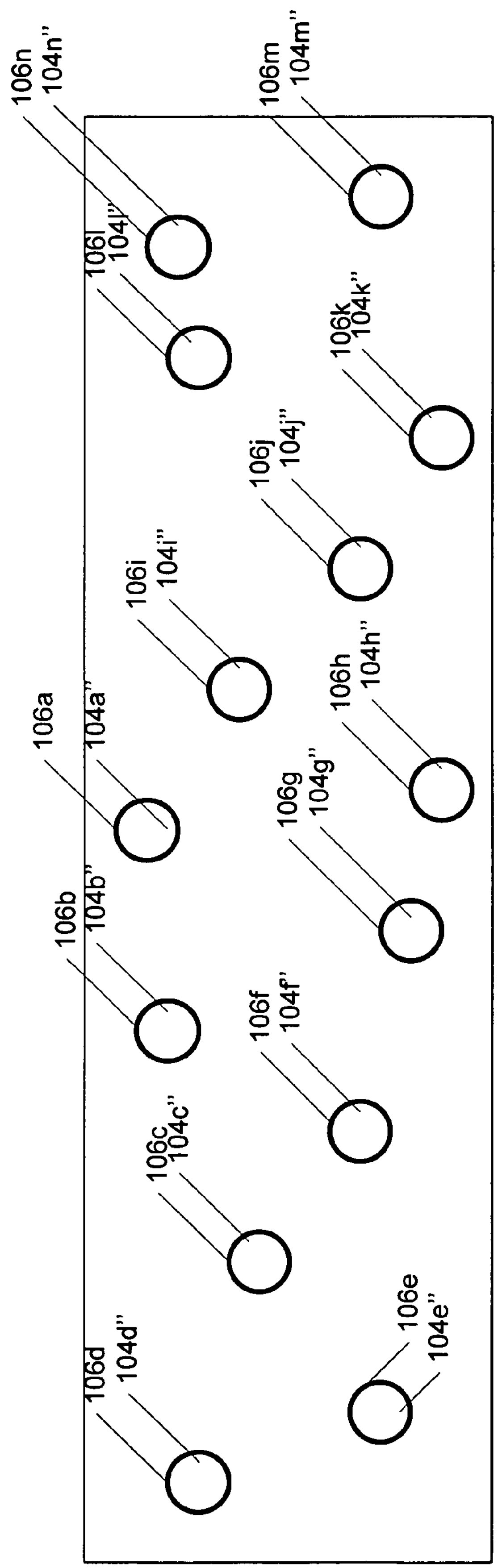
FIG. 5 illustrates a processed light guide element in accordance with the present invention.

FIG. 5 illustrates a processed light guide element 100" in accordance with the present invention. As is seen, the scattering elements 104" are coated with a photochromic coating 106. Existing coating technologies provide for the possibility of applying a very thin coat of photochromic coating. In one approach in accordance with the present invention, particles coated with TiO2, for example, might be immersed for coating, and when removed, the particles would have a very thin coating of UV sensitive material.

Figure 6:
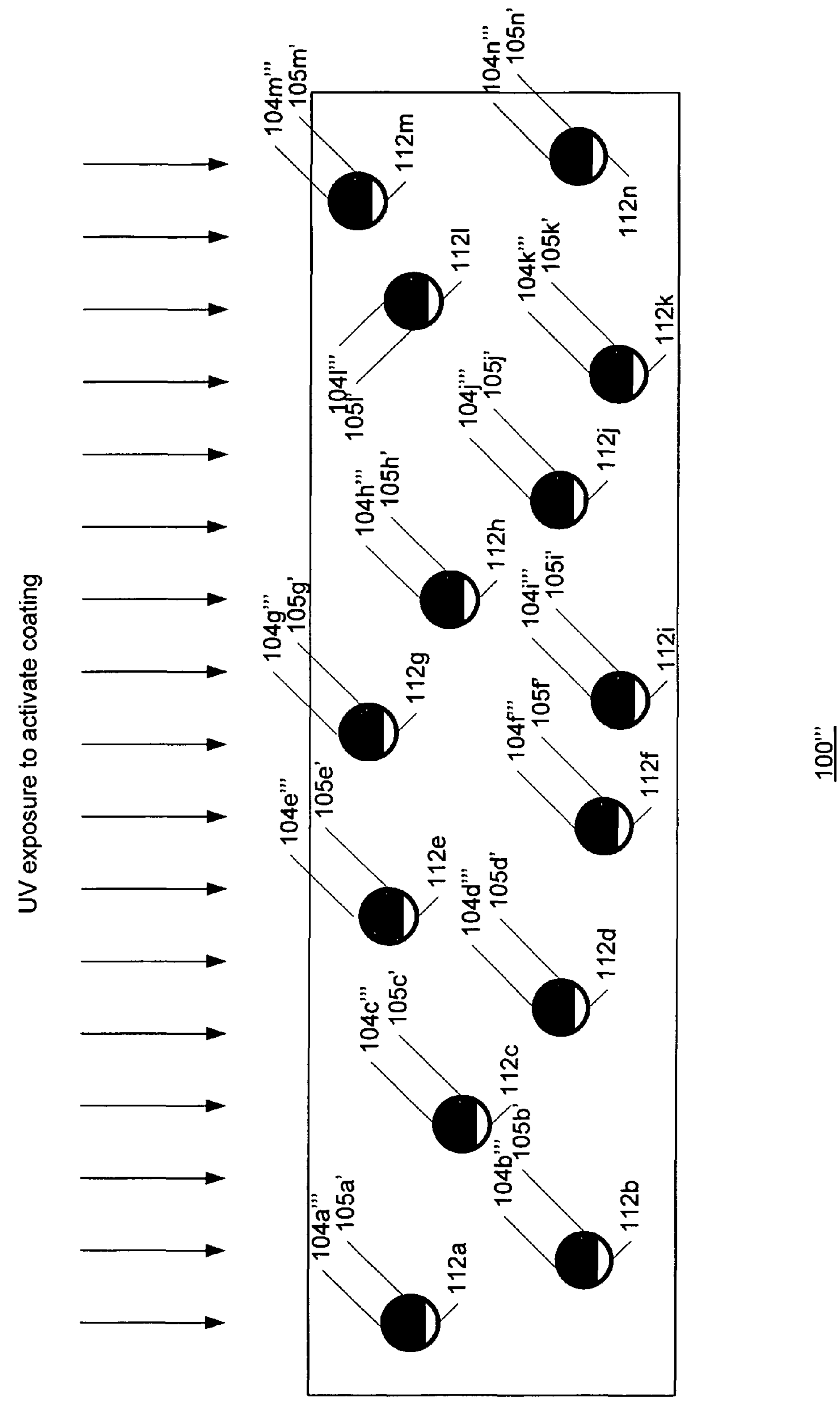
FIG. 6 illustrates providing an ultraviolet exposure to a top side of the light guide element 100'''.
Figure 7:
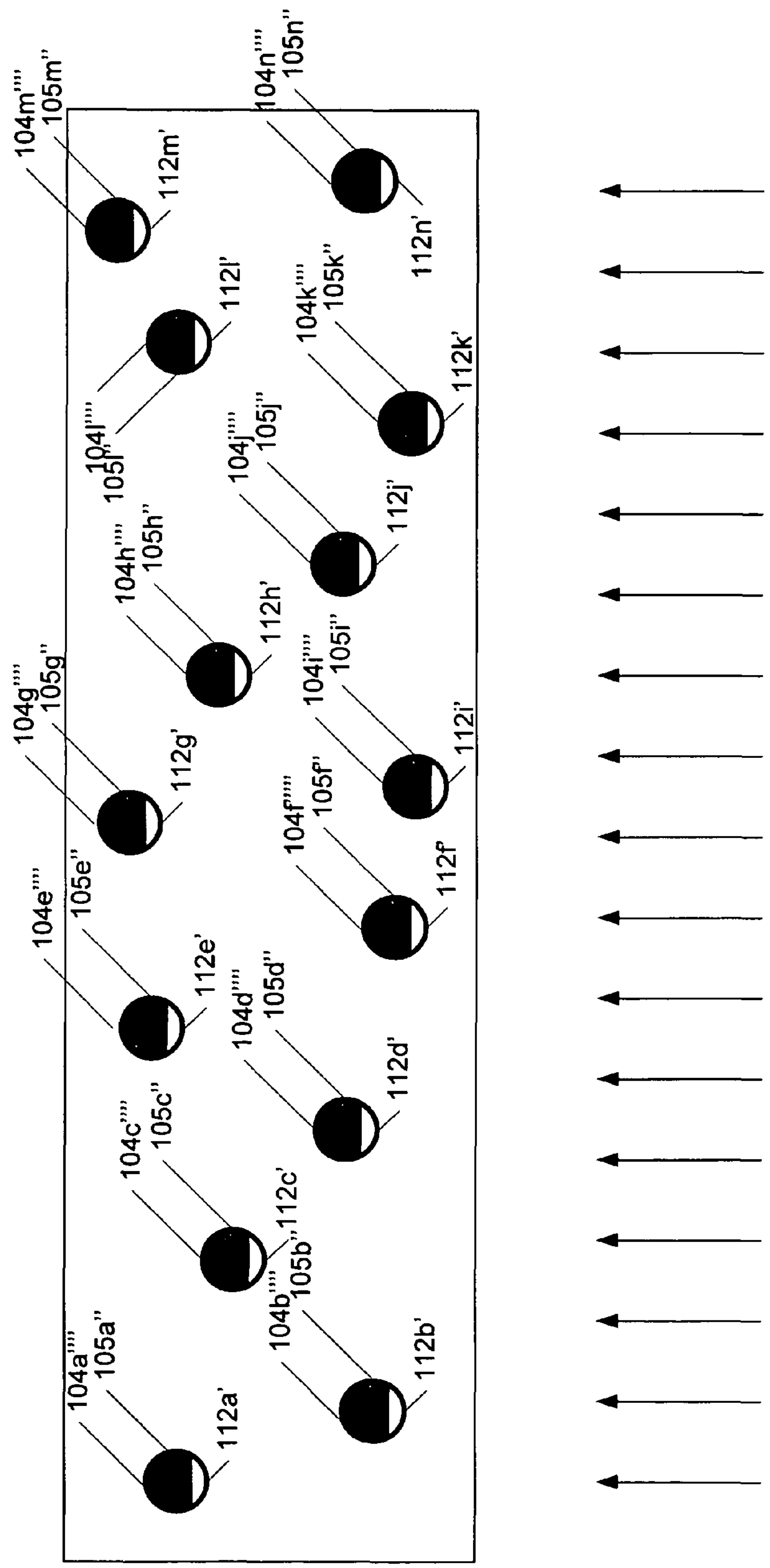
FIG. 7 illustrates the bottom portion of the scattering elements is then exposed to a second UV wavelength which deactivates the coating thereby preventing it from turning dark.

FIG. 6 illustrates providing an ultraviolet exposure to a top side of the light guide element 100'''. The element with the coated UV sensitive particles embedded within it is then exposed to UV wavelengths of a certain frequency, which activates the coating on the scattering elements 104'''. When the top side is exposed to the specified wavelength of UV, a portion 105' of the top of the coating on the scattering particles will darken. Referring now to FIG. 7, the bottom portion 112' of the scattering elements 104''' is then exposed to a second UV wavelength which deactivates the coating thereby preventing it from turning dark. The result is a light guide element 100"" with embedded scattering particles which are masked on one side. As a result in this embodiment there is a preferential direction for light away from the display side.

Figure 7A:
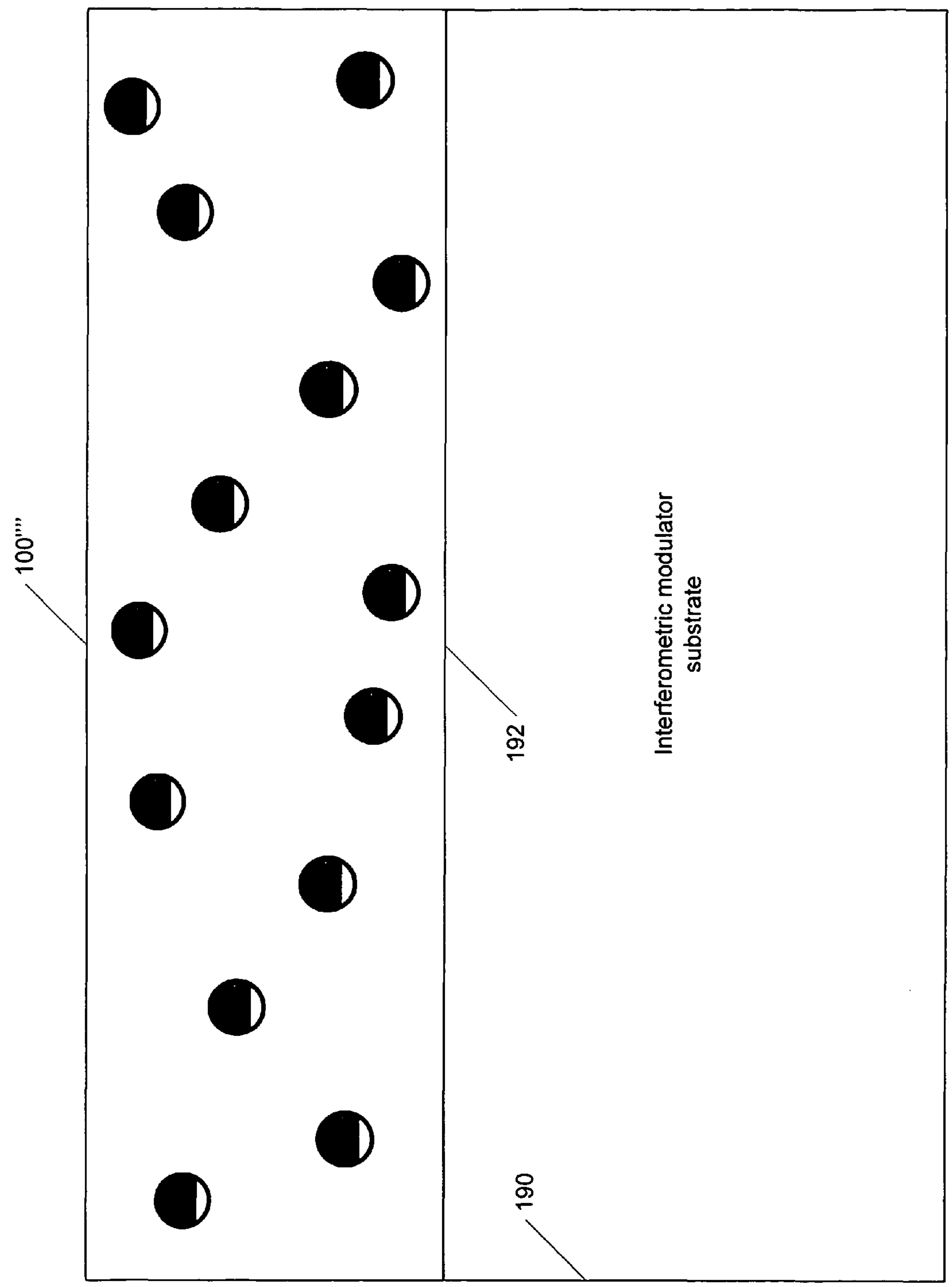
FIG. 7A illustrates the light guide element placed on an interferometric modulator substrate via an adhesive layer.

FIG. 7A illustrates the light guide element 100"" placed on an interferometric modulator substrate 190 via an adhesive layer 192. In a preferred embodiment the light guide film is indexed matched to the interferometric modulator sensor. As before mentioned, the optical scattering elements embedded in the bulk of the light guide material may be made of material such as $TiO_2$, although a number of other materials may also be utilized.

Accordingly, a light guide element in accordance with the present invention can be utilized advantageously in an interferometric modulator display application such as will be described in detail hereinbelow.

FIGS. 8 through 11B illustrate one exemplary process and system for using an array of interferometric modulators in a display application.

Figure 8:
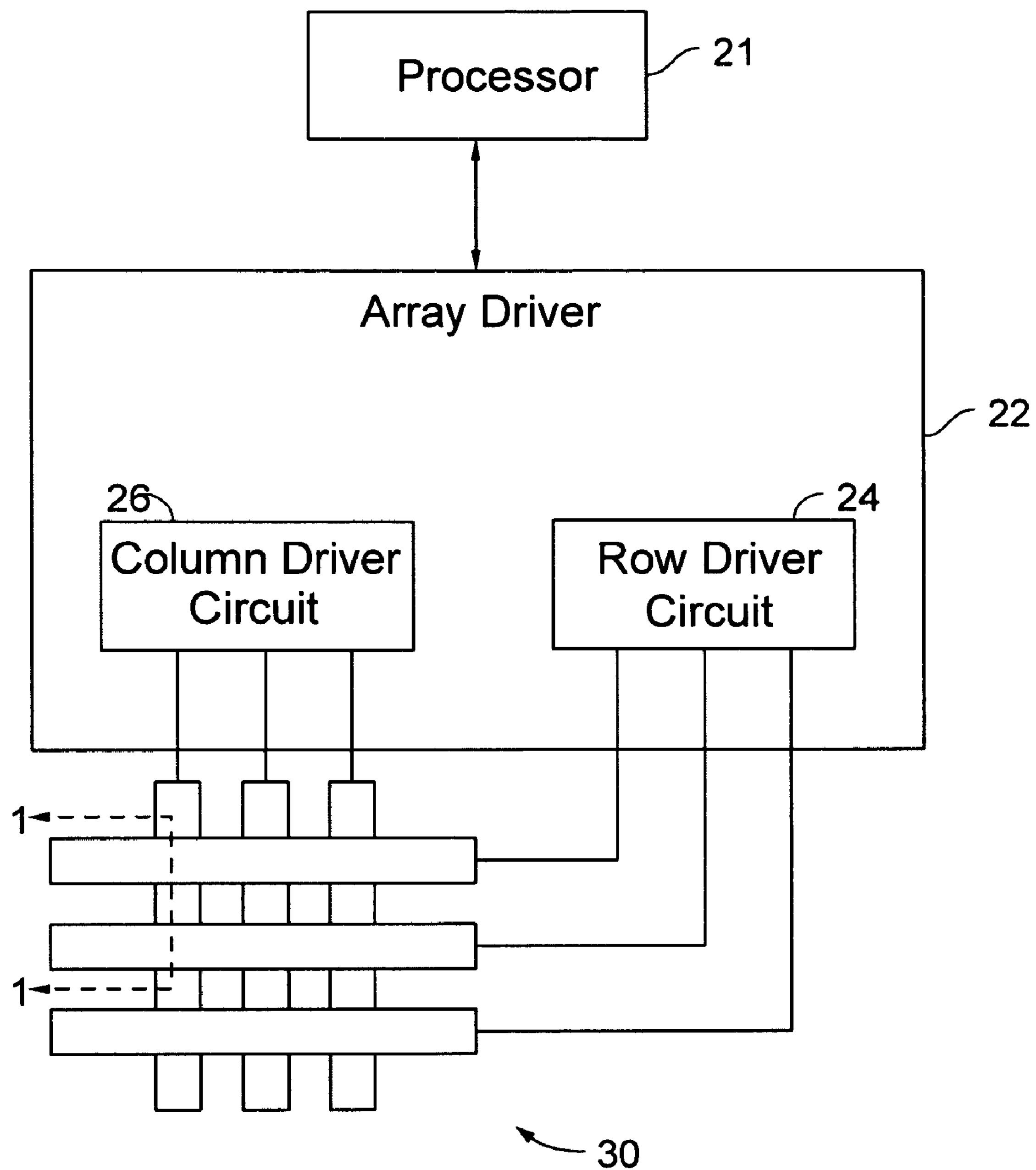
FIG. 8 is a system block diagram illustrating one embodiment of an electronic device incorporating a 3×3 interferometric modulator display.

FIG. 8 is a system block diagram illustrating one embodiment of an electronic device that may incorporate aspects of the invention. In the exemplary embodiment, the electronic device includes a processor 21 which may be any general purpose single- or multi-chip microprocessor such as an ARM, Pentium®, Pentium II®, Pentium III®, Pentium IV®, Pentium® Pro, an 8051, a MIPS®, a Power PC®, an ALPHA®, or any special purpose microprocessor such as a digital signal processor, microcontroller, or a programmable gate array. As is conventional in the art, the processor 21 may be configured to execute one or more software modules. In addition to executing an operating system, the processor may be configured to execute one or more software applications, including a web browser, a telephone application, an email program, or any other software application.

In one embodiment, the processor 21 is also configured to communicate with an array driver 22. In one embodiment, the array driver 22 includes a row driver circuit 24 and a column driver circuit 26 that provide signals to a display array or panel 30. The cross section of the array illustrated in FIG. 1 is shown by the lines 1-1 in FIG. 8. For MEMS interferometric modulators, the row/column actuation protocol may take advantage of a hysteresis property of these devices illustrated in FIG. 9. It may require, for example, a 10 volt potential difference to cause a movable layer to deform from the relaxed state to the actuated state. However, when the voltage is reduced from that value, the movable layer maintains its state as the voltage drops back below 10 volts. In the exemplary embodiment of FIG. 9, the movable layer does not relax completely until the voltage drops below 2 volts. There is thus a range of voltage, about 3 to 7 V in the example illustrated in FIG. 9, where there exists a window of applied voltage within which the device is stable in either the relaxed or actuated state. This is referred to herein as the "hysteresis window" or "stability window." For a display array having the hysteresis characteristics of FIG. 9, the row/column actuation protocol can be designed such that during row strobing, pixels in the strobed row that are to be actuated are exposed to a voltage difference of about 10 volts, and pixels that are to be relaxed are exposed to a voltage difference of close to zero volts. After the strobe, the pixels are exposed to a steady state voltage difference of about 5 volts such that they remain in whatever state the row strobe put them in. After being written, each pixel sees a potential difference within the "stability window" of 3-7 volts in this example. This feature makes the pixel design illustrated in FIG. 1 stable under the same applied voltage conditions in either an actuated or relaxed pre-existing state. Since each pixel of the interferometric modulator, whether in the actuated or relaxed state, is essentially a capacitor formed by the fixed and moving reflective layers, this stable state can be held at a voltage within the hysteresis window with almost no power dissipation. Essentially no current flows into the pixel if the applied potential is fixed.

In typical applications, a display frame may be created by asserting the set of column electrodes in accordance with the desired set of actuated pixels in the first row. A row pulse is then applied to the row 1 electrode, actuating the pixels corresponding to the asserted column lines. The asserted set of column electrodes is then changed to correspond to the desired set of actuated pixels in the second row. A pulse is then applied to the row 2 electrode, actuating the appropriate pixels in row 2 in accordance with the asserted column electrodes. The row 1 pixels are unaffected by the row 2 pulse, and remain in the state they were set to during the row 1 pulse. This may be repeated for the entire series of rows in a sequential fashion to produce the frame. Generally, the frames are refreshed and/or updated with new display data by continually repeating this process at some desired number of frames per second. A wide variety of protocols for driving row and column electrodes of pixel arrays to produce display frames are also well known and may be used in conjunction with the present invention.

Figures 9, 10:
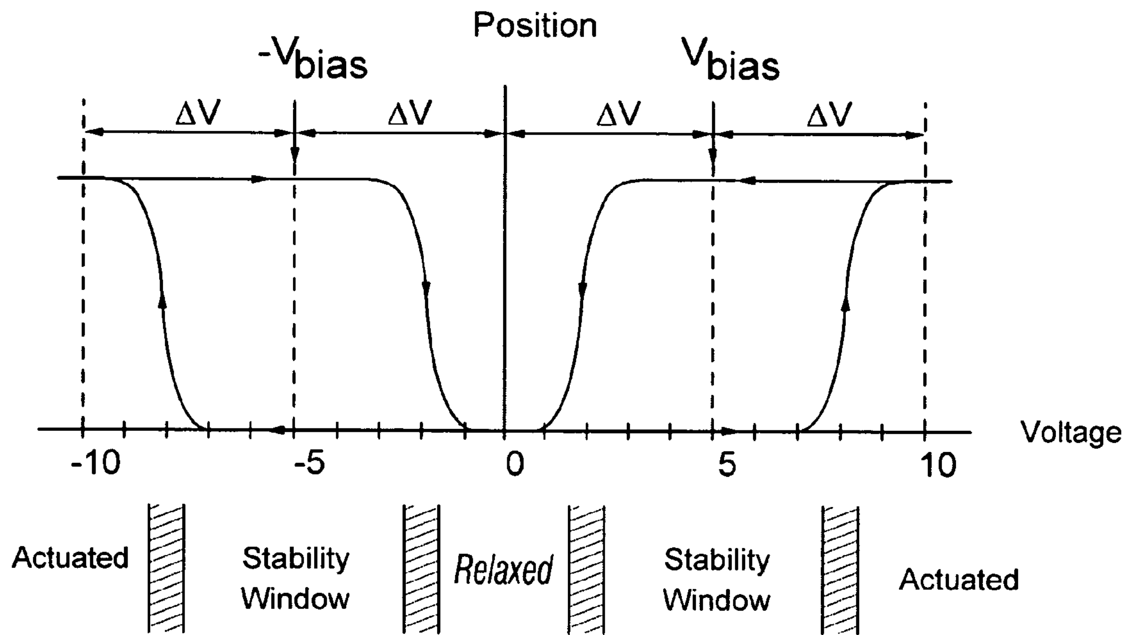
FIG. 9 is a diagram of movable mirror position versus applied voltage for one exemplary embodiment of an interferometric modulator of FIG. 1.
FIG. 10 is an illustration of a set of row and column voltages that may be used to drive an interferometric modulator display.
Figure 11A:
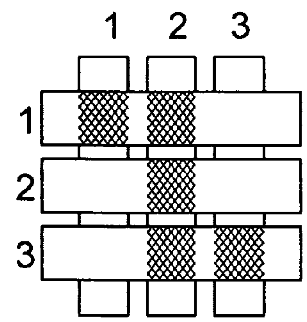
FIGS. 11A and 11B illustrate one exemplary timing diagram for row and column signals that may be used to write a frame of display data to the 3×3 interferometric modulator display of FIG. 8.
Figure 11B:
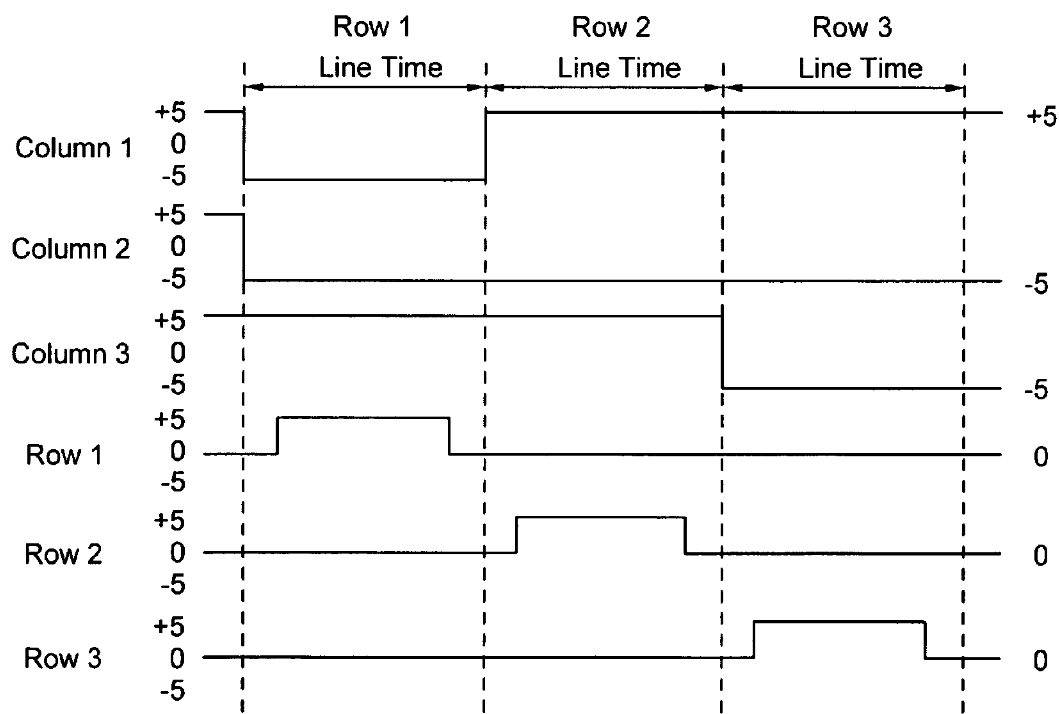

FIGS. 10, 11A and 11B illustrate one possible actuation protocol for creating a display frame on the 3×3 array of FIG. 8. FIG. 10 illustrates a possible set of column and row voltage levels that may be used for pixels exhibiting the hysteresis curves of FIG. 9. In the FIG. 10 embodiment, actuating a pixel involves setting the appropriate column to $-V_{bias}$, and the appropriate row to $+\Delta V$, which may correspond to −5 volts and +5 volts respectively Relaxing the pixel is accomplished by setting the appropriate column to $+V_{bias}$, and the appropriate row to the same $+\Delta V$, producing a zero volt potential difference across the pixel. In those rows where the row voltage is held at zero volts, the pixels are stable in whatever state they were originally in, regardless of whether the column is at $+V_{bias}$, or $-V_{bias}$. As is also illustrated in FIG. 10, it will be appreciated that voltages of opposite polarity than those described above can be used, e.g., actuating a pixel can involve setting the appropriate column to $+V_{bias}$, and the appropriate row to $-\Delta V$. In this embodiment, releasing the pixel is accomplished by setting the appropriate column to $-V_{bias}$, and the appropriate row to the same $-\Delta V$, producing a zero volt potential difference across the pixel.

FIG. 11 is a timing diagram showing a series of row and column signals applied to the 3×3 array of FIG. 2 which will result in the display arrangement illustrated in FIG. 11A, where actuated pixels are non-reflective. Prior to writing the frame illustrated in FIG. 11A, the pixels can be in any state, and in this example, all the rows are at 0 volts, and all the columns are at +5 volts. With these applied voltages, all pixels are stable in their existing actuated or relaxed states.

In the FIG. 11A frame, pixels (1,1), (1,2), (2,2), (3,2) and (3,3) are actuated. To accomplish this, during a "line time" for row 1, columns 1 and 2 are set to −5 volts, and column 3 is set to +5 volts. This does not change the state of any pixels, because all the pixels remain in the 3-7 volt stability window. Row 1 is then strobed with a pulse that goes from 0, up to 5 volts, and back to zero. This actuates the (1,1) and (1,2) pixels and relaxes the (1,3) pixel. No other pixels in the array are affected. To set row 2 as desired, column 2 is set to −5 volts, and columns 1 and 3 are set to +5 volts. The same strobe applied to row 2 will then actuate pixel (2,2) and relax pixels (2,1) and (2,3). Again, no other pixels of the array are affected. Row 3 is similarly set by setting columns 2 and 3 to −5 volts, and column 1 to +5 volts. The row 3 strobe sets the row 3 pixels as shown in FIG. 11A. After writing the frame, the row potentials are zero, and the column potentials can remain at either +5 or −5 volts, and the display is then stable in the arrangement of FIG. 11A. It will be appreciated that the same procedure can be employed for arrays of dozens or hundreds of rows and columns. It will also be appreciated that the timing, sequence, and levels of voltages used to perform row and column actuation can be varied widely within the general principles outlined above, and the above example is exemplary only, and any actuation voltage method can be used with the systems and methods described herein.

Figure 12A:
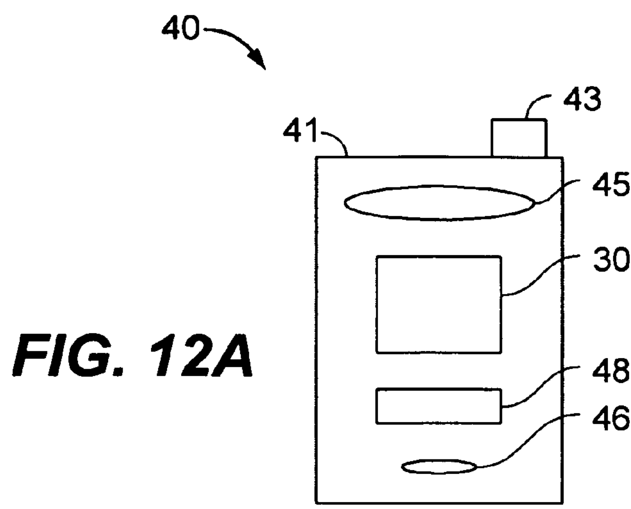
FIGS. 12A and 12B are system block diagrams illustrating an embodiment of a visual display device comprising a plurality of interferometric modulators.
Figure 12B:
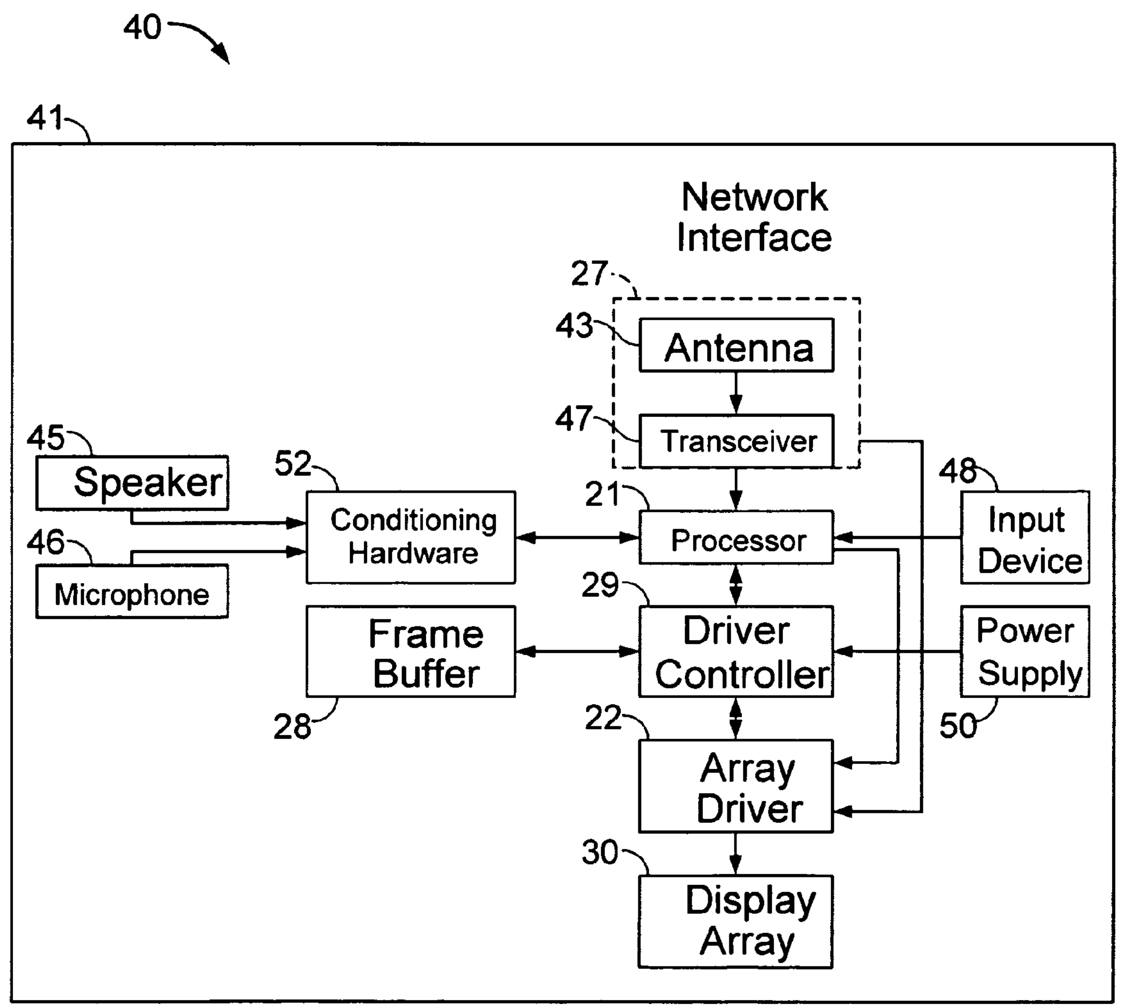

FIGS. 12A and 12B are system block diagrams illustrating an embodiment of a display device 40. The display device 40 can be, for example, a cellular or mobile telephone. However, the same components of display device 40 or slight variations thereof are also illustrative of various types of display devices such as televisions and portable media players.

The display device 40 includes a housing 41, a display 30, an antenna 43, a speaker 44, an input device 48, and a microphone 46. The housing 41 is generally formed from any of a variety of manufacturing processes as are well known to those of skill in the art, including injection molding, and vacuum forming. In addition, the housing 41 may be made from any of a variety of materials, including but not limited to plastic, metal, glass, rubber, and ceramic, or a combination thereof. In one embodiment the housing 41 includes removable portions (not shown) that may be interchanged with other removable portions of different color, or containing different logos, pictures, or symbols.

The display 30 of exemplary display device 40 may be any of a variety of displays, including a bi-stable display, as described herein. In other embodiments, the display 30 includes a flat-panel display, such as plasma, EL, OLED, STN LCD, or TFT LCD as described above, or a non-flat-panel display, such as a CRT or other tube device, as is well known to those of skill in the art. However, for purposes of describing the present embodiment, the display 30 includes an interferometric modulator display, as described herein.

The components of one embodiment of exemplary display device 40 are schematically illustrated in FIG. 12B. The illustrated exemplary display device 40 includes a housing 41 and can include additional components at least partially enclosed therein. For example, in one embodiment, the exemplary display device 40 includes a network interface 27 that includes an antenna 43 which is coupled to a transceiver 47. The transceiver 47 is connected to a processor 21, which is connected to conditioning hardware 52. The conditioning hardware 52 may be configured to condition a signal (e.g. filter a signal). The conditioning hardware 52 is connected to a speaker 45 and a microphone 46. The processor 21 is also connected to an input device 48 and a driver controller 29. The driver controller 29 is coupled to a frame buffer 28, and to an array driver 22, which in turn is coupled to a display array 30. A power supply 50 provides power to all components as required by the particular exemplary display device 40 design.

The network interface 27 includes the antenna 43 and the transceiver 47 so that the exemplary display device 40 can communicate with one ore more devices over a network. In one embodiment the network interface 27 may also have some processing capabilities to relieve requirements of the processor 21. The antenna 43 is any antenna known to those of skill in the art for transmitting and receiving signals. In one embodiment, the antenna transmits and receives RF signals according to the IEEE 802.11 standard, including IEEE 802.11 (a), (b), or (g). In another embodiment, the antenna transmits and receives RF signals according to the BLUETOOTH standard. In the case of a cellular telephone, the antenna is designed to receive CDMA, GSM, AMPS or other known signals that are used to communicate within a wireless cell phone network. The transceiver 47 pre-processes the signals received from the antenna 43 so that they may be received by and further manipulated by the processor 21. The transceiver 47 also processes signals received from the processor 21 so that they may be transmitted from the exemplary display device 40 via the antenna 43.

In an alternative embodiment, the transceiver 47 can be replaced by a receiver. In yet another alternative embodiment, network interface 27 can be replaced by an image source, which can store or generate image data to be sent to the processor 21. For example, the image source can be a digital video disc (DVD) or a hard-disc drive that contains image data, or a software module that generates image data.

Processor 21 generally controls the overall operation of the exemplary display device 40. The processor 21 receives data, such as compressed image data from the network interface 27 or an image source, and processes the data into raw image data or into a format that is readily processed into raw image data. The processor 21 then sends the processed data to the driver controller 29 or to frame buffer 28 for storage. Raw data typically refers to the information that identifies the image characteristics at each location within an image. For example, such image characteristics can include color, saturation, and gray-scale level.

In one embodiment, the processor 21 includes a microcontroller, CPU, or logic unit to control operation of the exemplary display device 40. Conditioning hardware 52 generally includes amplifiers and filters for transmitting signals to the speaker 45, and for receiving signals from the microphone 46. Conditioning hardware 52 may be discrete components within the exemplary display device 40, or may be incorporated within the processor 21 or other components.

The driver controller 29 takes the raw image data generated by the processor 21 either directly from the processor 21 or from the frame buffer 28 and reformats the raw image data appropriately for high speed transmission to the array driver 22. Specifically, the driver controller 29 reformats the raw image data into a data flow having a raster-like format, such that it has a time order suitable for scanning across the display array 30. Then the driver controller 29 sends the formatted information to the array driver 22. Although a driver controller 29, such as a LCD controller, is often associated with the system processor 21 as a stand-alone Integrated Circuit (IC), such controllers may be implemented in many ways. They may be embedded in the processor 21 as hardware, embedded in the processor 21 as software, or fully integrated in hardware with the array driver 22.

Typically, the array driver 22 receives the formatted information from the driver controller 29 and reformats the video data into a parallel set of waveforms that are applied many times per second to the hundreds and sometimes thousands of leads coming from the display's x-y matrix of pixels.

In one embodiment, the driver controller 29, array driver 22, and display array 30 are appropriate for any of the types of displays described herein. For example, in one embodiment, driver controller 29 is a conventional display controller or a bi-stable display controller (e.g., an interferometric modulator controller). In another embodiment, array driver 22 is a conventional driver or a bi-stable display driver (e.g., an interferometric modulator display). In one embodiment, a driver controller 29 is integrated with the array driver 22. Such an embodiment is common in highly integrated systems such as cellular phones, watches, and other small area displays. In yet another embodiment, display array 30 is a typical display array or a bi-stable display array (e.g., a display including an array of interferometric modulators).

The input device 48 allows a user to control the operation of the exemplary display device 40. In one embodiment, input device 48 includes a keypad, such as a QWERTY keyboard or a telephone keypad, a button, a switch, a touch-sensitive screen, a pressure- or heat-sensitive membrane. In one embodiment, the microphone 46 is an input device for the exemplary display device 40. When the microphone 46 is used to input data to the device, voice commands may be provided by a user for controlling operations of the exemplary display device 40.

Power supply 50 can include a variety of energy storage devices as are well known in the art. For example, in one embodiment, power supply 50 is a rechargeable battery, such as a nickel-cadmium battery or a lithium ion battery. In another embodiment, power supply 50 is a renewable energy source, a capacitor, or a solar cell, including a plastic solar cell, and solar-cell paint. In another embodiment, power supply 50 is configured to receive power from a wall outlet.

In some implementations control programmability resides, as described above, in a driver controller which can be located in several places in the electronic display system. In some cases control programmability resides in the array driver 22. Those of skill in the art will recognize that the above-described optimization may be implemented in any number of hardware and/or software components and in various configurations.

Figure 13A:
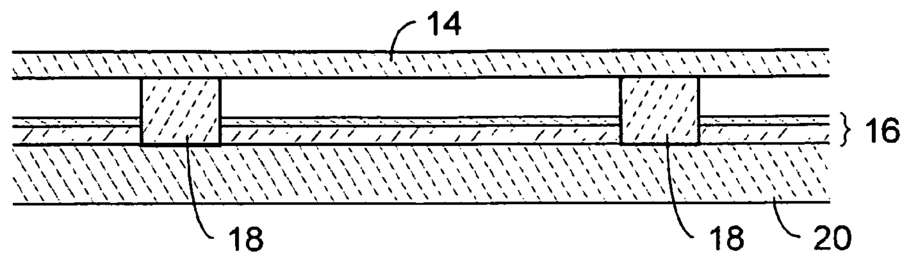
FIG. 13A is a cross section of the device of FIG. 1.
Figure 13B:
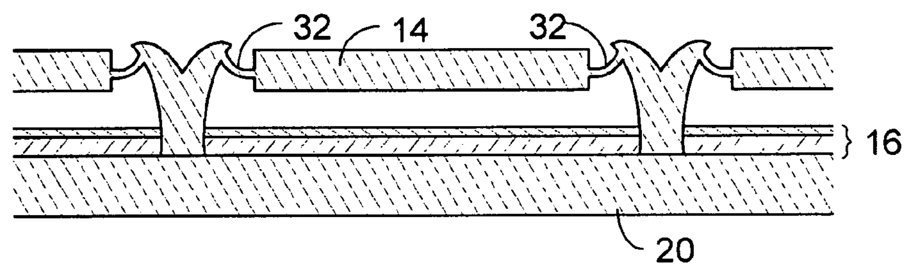
FIG. 13B is a cross section of an alternative embodiment of an interferometric modulator.
Figure 13C:
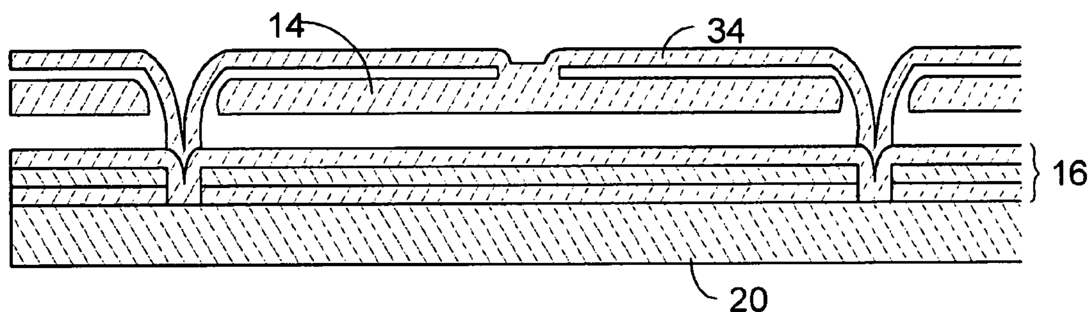
FIG. 13C is a cross section of another alternative embodiment of an interferometric modulator.
Figure 13D:
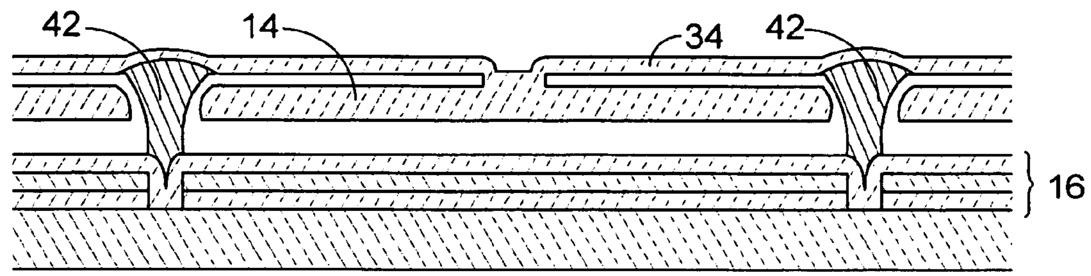
FIG. 13D is a cross section of yet another alternative embodiment of an interferometric modulator.
Figure 13E:
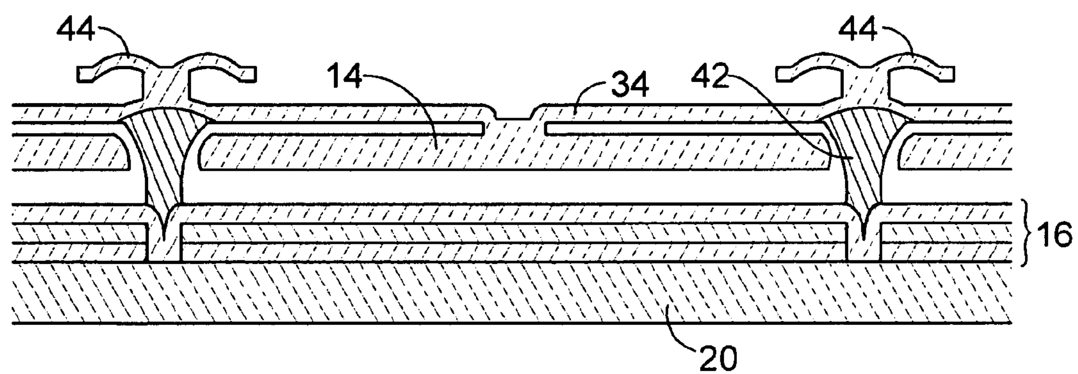
FIG. 13E is a cross section of an additional alternative embodiment of an interferometric modulator.

The details of the structure of interferometric modulators that operate in accordance with the principles set forth above may vary widely. For example, FIGS. 13A-13E illustrate five different embodiments of the movable reflective layer 14 and it's supporting structures. FIG. 13A is a cross section of the embodiment of FIG. 1, where a strip of metal material 14 is deposited on orthogonally extending supports 18. In FIG. 13B, the moveable reflective layer 14 is attached to supports at the corners only, on tethers 32. In FIG. 13C, the moveable reflective layer 14 is suspended from a deformable layer 34, which may comprise a flexible metal. The deformable layer 34 connects, directly or indirectly, to the substrate 20 around the perimeter of the deformable layer 34. These connections are herein referred to as support posts. The embodiment illustrated in FIG. 13D has support post plugs 42 upon which the deformable layer 34 rests. The movable reflective layer 14 remains suspended over the gap, as in FIGS. 13A-13C, but the deformable layer 34 does not form the support posts by filling holes between the deformable layer 34 and the optical stack 16. Rather, the support posts are formed of a planarization material, which is used to form support post plugs 42. The embodiment illustrated in FIG. 13E is based on the embodiment shown in FIG. 13D, but may also be adapted to work with any of the embodiments illustrated in FIGS. 13A-13C as well as additional embodiments not shown. In the embodiment shown in FIG. 13E, an extra layer of metal or other conductive material has been used to form a bus structure 44. This allows signal routing along the back of the interferometric modulators, eliminating a number of electrodes that may otherwise have had to be formed on the substrate 20.

In embodiments such as those shown in FIG. 13A-13E7, the interferometric modulators function as direct-view devices, in which images are viewed from the front side of the transparent substrate 20, the side opposite to that upon which the modulator is arranged. In these embodiments, the reflective layer 14 optically shields the portions of the interferometric modulator on the side of the reflective layer opposite the substrate 20, including the deformable layer 34. This allows the shielded areas to be configured and operated upon without negatively affecting the image quality. Such shielding allows the bus structure 44 in FIG. 13E, which provides the ability to separate the optical properties of the modulator from the electromechanical properties of the modulator, such as addressing and the movements that result from that addressing. This separable modulator architecture allows the structural design and materials used for the electromechanical aspects and the optical aspects of the modulator to be selected and to function independently of each other. Moreover, the embodiments shown in FIGS. 13C-13E have additional benefits deriving from the decoupling of the optical properties of the reflective layer 14 from its mechanical properties, which are carried out by the deformable layer 34. This allows the structural design and materials used for the reflective layer 14 to be optimized with respect to the optical properties, and the structural design and materials used for the deformable layer 34 to be optimized with respect to desired mechanical properties.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for fabrication on an interferometric modulator system comprising:

providing a light guide element which includes a plurality of scattering elements located therein;

providing an interferometric modulator disposed with respect to the light guide to receive light therefrom; and applying ultra-violet (UV) light to at least a portion of a coating on at least a portion of said scattering elements, thereby masking at least a portion of said scattering elements, wherein the applying step comprises:

activating the coating on a first side by providing UV light to the first side at a first wavelength; and deactivating the coating on a second side substantially opposite the first side to maintain the optical scattering character of the scattering elements.

2. The method of claim 1 wherein the light guide element is provided utilizing any of injection molding, compression molding, spincasting, extrusion molding and blow molding.

3. The method of claim 1 wherein the at least a portion of the scattering elements are provided in a randomly distributed fashion within the light guide element.

4. The method of claim 1 wherein the at least a portion of the scattering elements are provided with a portion of the scattering elements protruding from the top portion of the light guide element.

5. The method of claim 1 wherein all of the scattering elements are provided in a distributed fashion within the top portion of the light guide element.

6. The method of claim 1, wherein the coating comprises a photochromic material.

7. The method of claim 1, further comprising providing an adhesive layer on the interferometric modulator.

8. The method of claim 7, wherein the light guide element is placed on the adhesive layer.

9. An interferometric modulator system comprising:

a light guide element including a plurality of scattering elements therewithin, at least a portion of said scattering elements masked by a photochromic material, said material on a first side configured to be activated by application of ultra-violet (UV) light at a first wavelength, said material on a second side configured to be deactivated by application of UV light at a second wavelength; and an interferometric modulator disposed with respect to the light guide to receive light therefrom.

10. The interferometric modulator system of claim 9 wherein a top portion of each of the at least one portion of the plurality of scattering elements are masked.

11. The interferometric modulator system of claim 9 wherein the at least a portion of the masked scattering elements are distributed in a random fashion within the light guide element.

12. The system of claim 9 wherein a portion of the scattering elements protrude from the top portion of the light guide element.

13. The system of claim 9 wherein the scattering elements are provided in a distributed fashion within the top portion of the light guide element.

14. The system of claim 9 further comprising:

a display comprising the interferometric modulator;

a processor that is configured to communicate with said display, said processor being configured to process image data; and a memory device that is configured to communicate with said processor.

15. The system as recited in claim 14, further comprising:

a driver circuit configured to send at least one signal to said display.

16. The system as recited in claim 15, further comprising:

a controller configured to send at least a portion of said image data to said driver circuit.

17. The system as recited in claim 14, further comprising:

an image source module configured to send said image data to said processor.

18. The system as recited in claim 17, wherein said image source module comprises at least one of a receiver, transceiver, and transmitter.

19. The system as recited in claim 17, further comprising:

an input device configured to receive input data and to communicate said input data to said processor.

20. The system of claim 9, further comprising an adhesive layer on the interferometric modulator.

21. The system of claim 20, wherein the light guide element is placed on the adhesive layer.

22. The system of claim 9, wherein the material comprises a coating.

* * * * *